(12) United States Patent
Takura

(10) Patent No.: US 6,947,170 B2
(45) Date of Patent: Sep. 20, 2005

(54) IMAGE PROCESSING DEVICE AND IMAGE PROCESSING METHOD

(75) Inventor: Keizo Takura, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 10/660,613

(22) Filed: Sep. 12, 2003

(65) Prior Publication Data

US 2004/0046974 A1 Mar. 11, 2004

Related U.S. Application Data

(62) Division of application No. 09/425,007, filed on Oct. 25, 1999, now Pat. No. 6,674,551.

(30) Foreign Application Priority Data

Oct. 27, 1998 (JP) ............................................ 10-305230

(51) Int. Cl.[7] .............................................. G06K 15/00
(52) U.S. Cl. ....................................... 358/1.2; 382/298
(58) Field of Search ................................. 358/1.2, 3.11, 358/3.12, 451, 448, 258, 298; 382/258, 298

(56) References Cited

U.S. PATENT DOCUMENTS

| | | | | |
|---|---|---|---|---|
| 4,833,531 A | * | 5/1989 | Abe et al. .................... | 382/300 |
| 5,428,461 A | | 6/1995 | Yamashita et al. .......... | 358/451 |
| 5,812,111 A | | 9/1998 | Fuji ............................. | 345/131 |
| 6,078,410 A | * | 6/2000 | Adachi ........................ | 358/522 |
| 6,674,551 B1 | * | 1/2004 | Takura ........................ | 358/451 |
| 2001/0048530 A1 | * | 12/2001 | Hayashi et al. ............ | 358/1.13 |

FOREIGN PATENT DOCUMENTS

| | | |
|---|---|---|
| EP | 0 369 301 | 5/1990 |
| EP | 0 625 761 | 11/1994 |

* cited by examiner

*Primary Examiner*—Jerome Grant, II
(74) *Attorney, Agent, or Firm*—Fitzpatrick, Cella, Harper & Scinto

(57) ABSTRACT

There is disclosed an image processing device for performing a conversion processing of image data, comprises an input unit for inputting image data, an enlargement/reduction magnification setting unit for setting an enlargement/reduction magnification of the image data inputted by the input unit, a data converting unit having a plurality of image data conversion tables and using one selected conversion table to convert the inputted image data to output data, and a table selecting unit for selecting the conversion table in accordance with the enlargement/reduction magnification set by the enlargement/reduction magnification setting unit. In the enlargement/output of the image by the image processing, the edge portion of output image can be prevented from being blurred by the enlargement processing. Moreover, in the reduction/output of the image, even when the reduction processing is performed, the reproducibility of intermediate gradation density fine lines in the input image can be enhanced.

32 Claims, 14 Drawing Sheets

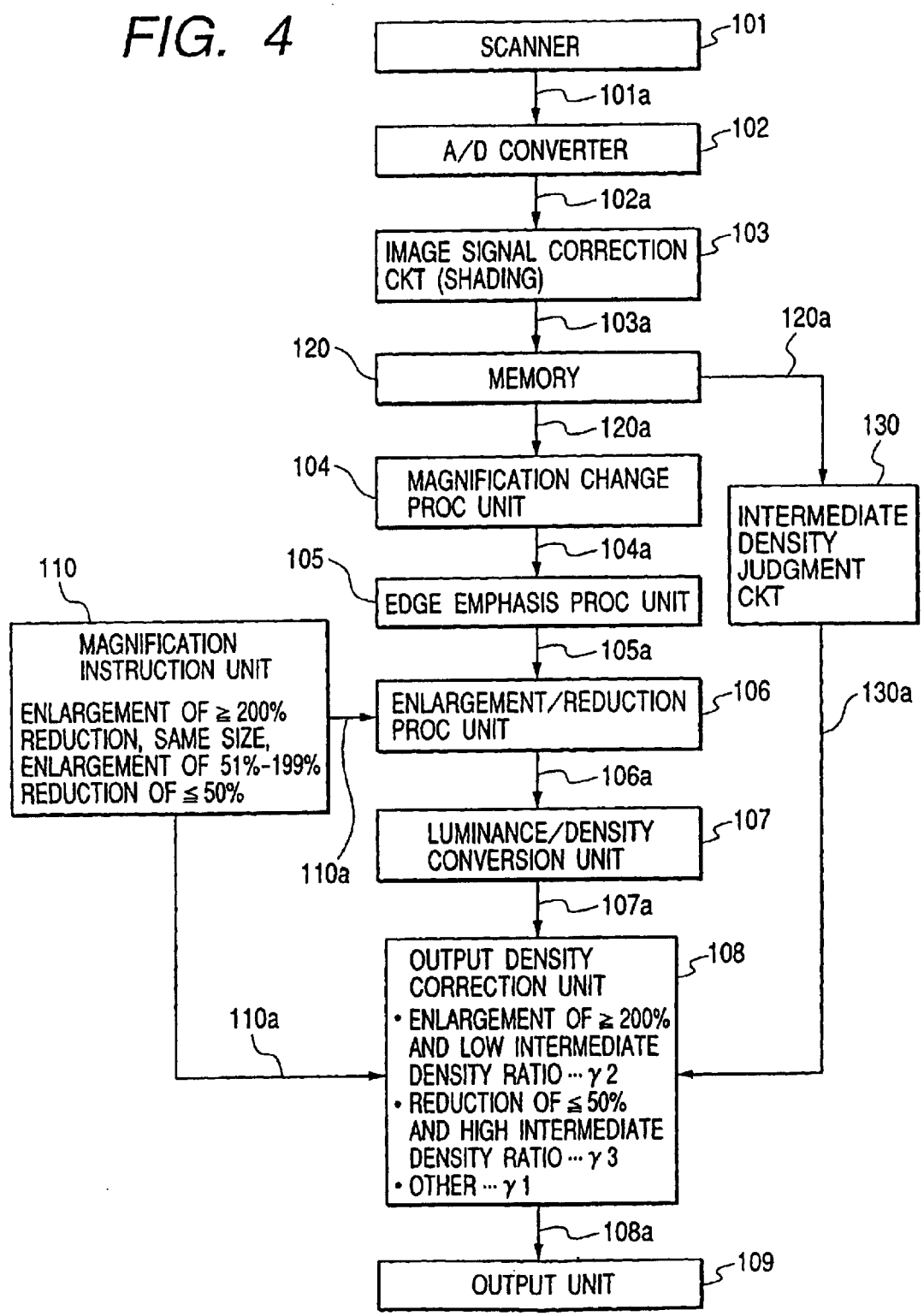

POSITION

POSITION
(IN 50% REDUCTION)

POSITION
(IN 200% ENLARGEMENT)

IMAGE PROCESSING DEVICE AND IMAGE PROCESSING METHOD

This application is a divisional application of U.S. application Ser. No. 09/425,007, filed Oct. 25, 1999, now U.S. Pat. No. 6,674,551.

BACKGROUND OF THE INVENTION

1. Field of the Invention

The present invention relates to an image processing device and an image processing method which can be applied to image forming devices such as a digital copying machine, and a facsimile machine, and in which a conversion processing is performed on image signals.

2. Related Background Art

In general, in image forming devices such as a digital copying machine, and a facsimile device, first, light reflected by an original is received and converted to an electric signal by CCD, and the like, and a resulting analog luminance signal is converted to a digital luminance signal by A/D converter, and the like, so that a multivalued luminance signal of an original image is obtained.

Next, for example, by referring to a luminance/density conversion table prepared beforehand, the original image signal is converted to a multivalued image density signal based on luminance/density conversion information.

Moreover, it is assumed that a user desires to enlarge or reduce an image, and selects and sets an enlargement/reduction magnification by operating an external key or the like. In this case, after enlarging/reducing an image luminance signal, the signal is converted to a multivalued image density signal by referring to a luminance/density conversion table.

For example, an output density correction table is used to convert the resulting image density signal to the image density signal corresponding to a printer characteristic, and the converted image density signal is outputted via a printer. This is applied to the digital copying machine.

Moreover, the resulting image density signal is converted to the output density signal suitable for an image resolution, for example, using the output density correction table. Subsequently, the signal is converted to binary data, which is further subjected to a predetermined compression processing, and then transmitted to a reception device via a communication channel or the like. This is applied to the device on the facsimile transmission side.

Furthermore, depending on the type of the original image, the image density signal is set to have a higher density than the actual original density so that image quality is enhanced in some cases, and only a low density portion is set to have a dropped density as compared with the actual original density so that the image quality is enhanced in other cases.

For example, the former cases represent character originals, and the latter cases represent photograph originals. In this case, when the user sets the type of the original as a mode, the luminance/density conversion table, or the output density correction table is changed in accordance with the mode.

Moreover, based on the mode set by the user, a luminance/output density conversion table (a table to input luminance data and output density data) for the mode is first calculated from the luminance/density conversion table and the output density correction table to prepare LUT (lookup table). By referring to the data, data conversion is implemented for output or transmission. This is also known.

However, the above-described conventional examples have the following problems.

When the image is enlarged/outputted, by the enlarged image processing, the resolution of output image is apparently deteriorated as compared with the resolution of input image, so that the edge portion of the image signal is blurred.

This respect will be described with reference to FIGS. 14A to 14C. When the image of FIG. 14A is subjected to 200% enlargement (FIG. 14C), the image edge portion is also doubled, and the outputted image seems to be blurred.

Moreover, when the image is reduced/outputted, for intermediate-gradation density fine lines, and the like within the input image, the value of the output image signal is lowered by the reduced image processing in some cases.

These cases will also be described with reference to FIGS. 14A to 14C. When the image of FIG. 14A is subjected to 50% reduction (FIG. 14B), assuming that the output resolution is doubled as compared with the reading resolution, the image edge portion also becomes half, so that the intermediate gradation area in the outputted image is largely decreased.

In this case, if the reading resolution is substantially equal to the output resolution, the image is thinned out, so that the intermediate gradation is eliminated in some cases.

SUMMARY OF THE INVENTION

An object of the present invention is to remove the defects of the above-described conventional art and to provide an image processing device and an image processing method in which by selecting a conversion table for converting input image data to output image data in accordance with an enlargement/reduction magnification, an image quality can be prevented from being deteriorated by an enlargement or reduction processing with a simple constitution.

To achieve the above-described object, according to the present invention, there is provided an image processing device, comprising: input means for inputting image data; enlargement/reduction magnification setting means for setting an enlargement/reduction magnification of the image data inputted by the input means; data converting means having a plurality of image data conversion tables and using one selected conversion table to convert the inputted image data to output data; and table selecting means for selecting the conversion table in accordance with the enlargement/reduction magnification set by the enlargement/reduction magnification setting means.

Moreover, according to the present invention there is provided an image processing method, comprising: an input process of inputting image data; an enlargement/reduction magnification setting process of setting an enlargement/reduction magnification of the image data inputted by the input process; a data converting process having a plurality of image data conversion tables and using one selected conversion table to convert the inputted image data to output data; and a table selecting process of selecting the conversion table in accordance with the enlargement/reduction magnification set by the enlargement/reduction magnification setting process.

Furthermore, according to the present invention there is provided an image processing device, comprising: input means for inputting image data; enlargement/reduction magnification setting means for setting an enlargement/reduction magnification of the image data inputted by the input means; table calculating means for calculating a conversion table for converting input image data to output image data; and data converting means using the conversion table calculated by the calculating means to convert the inputted image data to output data. The table calculating means calculates the conversion table in accordance with the enlargement/reduction magnification set by the enlargement/reduction magnification setting means.

Additionally, according to the present invention there is provided an image processing method, comprising: an input process of inputting image data; an enlargement/reduction magnification setting process of setting an enlargement/reduction magnification of the image data inputted by the input process; a table calculating process for calculating a conversion table for converting input image data to output image data; and a data converting process for using the conversion table calculated by the calculating process to convert the inputted image data to output data. The table calculating process comprises calculating the conversion table in accordance with the enlargement/reduction magnification set by the enlargement/reduction magnification setting process.

Another object of the present invention is to provide an image processing device and an image processing method in which when an enlargement magnification is set to a predetermined value or more, data conversion is performed using a conversion table in which a change amount of output image data is enlarged with respect to the change amount of input image data, so that an edge portion can be prevented from being blurred during an enlargement processing.

Still another object of the present invention is to provide an image processing device and an image processing method in which when a reduction magnification is set to a predetermined value or less, data conversion is performed using a conversion table in which a change amount of output image data is reduced with respect to the change amount of input image data, so that the reproducibility of intermediate-density fine lines during a reduction processing can be enhanced.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a block diagram showing the constitution of the image processing device according to a second embodiment;

DETAILED DESCRIPTION OF THE PREFERRED EMBODIMENTS

Preferred embodiments of the present invention will now be described in detail in accordance with the accompanying drawings.

[First Embodiment]

The first embodiment of the present invention will be described with reference to FIGS. 1, 2, 3A, 3B and 3C.

(Outline)

First, the outline of the first embodiment will be described.

According to the first embodiment, an image processing device comprises a scanner 101 for inputting an image density signal, an image enlargement/reduction processing unit 106 for enlarging or reducing an image signal, an enlargement/reduction magnification instruction unit 110 for setting the enlargement/reduction magnification of the image enlargement/reduction processing unit 106, and an output density correction unit 108 for correcting the image density signal to provide a density signal appropriate for an image forming device and an output resolution. The device is provided with a plurality of output density correction tables for use as the output density correction unit 108, and the output density correction table is changed in accordance with the enlargement/reduction magnification set by the enlargement/reduction magnification instruction unit 110.

Moreover, the device is provided with a plurality of output density correction tables as the output density correction unit 108, and the output density correction table is changed only during enlargement in accordance with the enlargement/reduction magnification set by the enlargement/reduction magnification instruction unit 110.

A concrete example will be described hereinafter.

Figure 1:
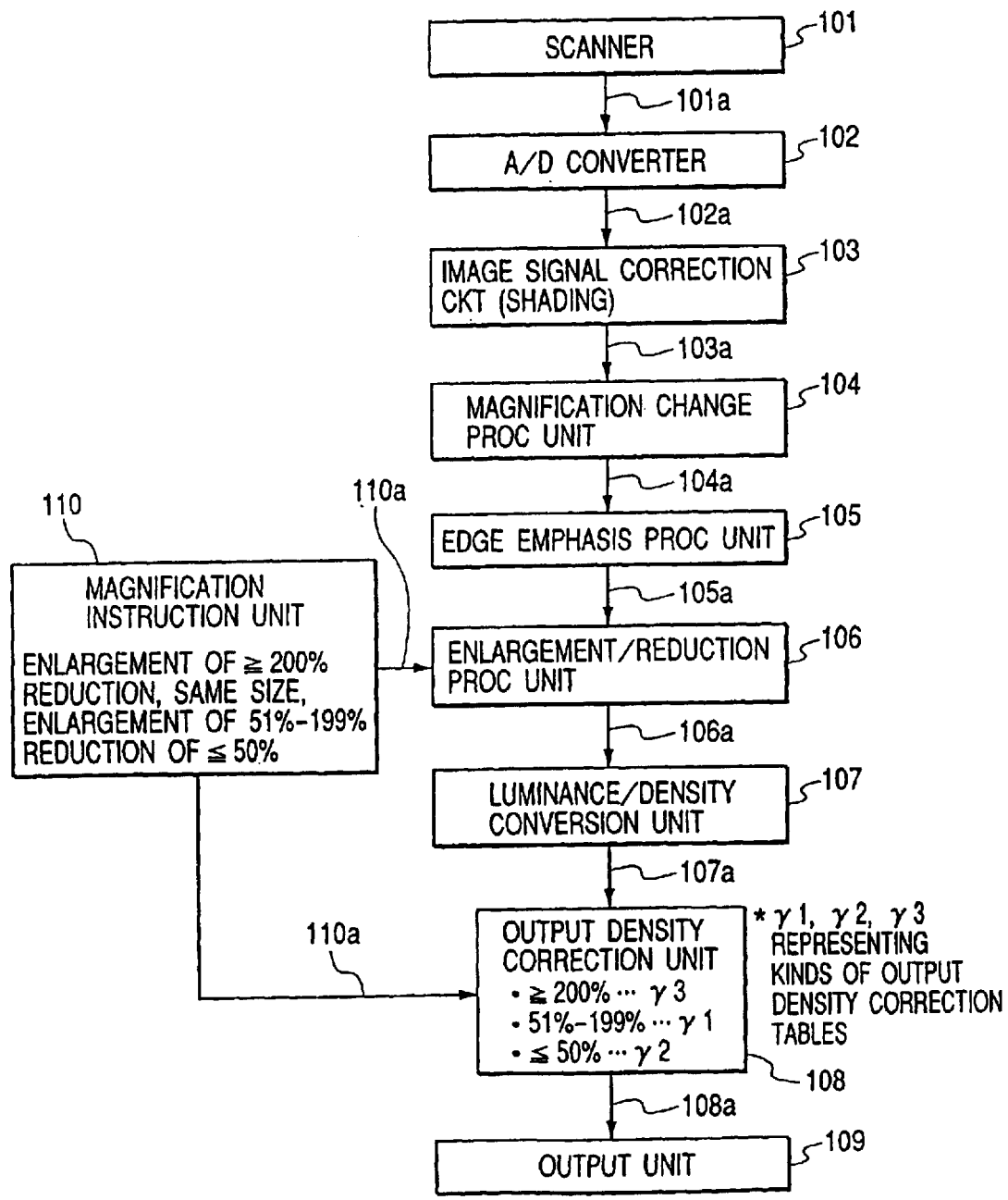
FIG. 1 is a block diagram showing the constitution of an image processing device according to a first embodiment of the present invention.

FIG. 1 shows the constitution of the image processing device according to the first embodiment, and an image processing flow.

A scanner 101 for reading an original is constituted of CCD (solid image pick-up element) image sensor, or a CS (contact sensor). Numeral 101a denotes an analog video signal outputted from the scanner 101.

First, the analog video signal 101a as analog image data read by the scanner 101 is quantized to form digital image data 102a of eight bits by an A/D converter 102. Additionally, the digital image data comprises luminance data. Moreover, for the number of gradations, there are 256 gradations. The luminance of white paper mainly used by a user comprises 255 data, and the darkness when a scanner lamp is turned off is set to 0.

The luminance data 102a from the A/D converter 102 is corrected by an image signal correction circuit 103 in the sensitivity nonuniformity of CCD or CS of the scanner 101 and shading strain as the strain of light distribution characteristic of a light source. Shading correction includes the correction of light distribution characteristic among pixels of CCD in every operation, and the adjustment of the analog signal intensity of the entire CCD when a change occurs in an original lighting system by durability or the like. At this time, original image data 103a is completed. The obtained image data comprises multivalued luminance data quantized at the ratio of eight bits per pixel.

Moreover, since the reading unit and output unit of CCD or CS have different resolutions, resolution conversion by a magnification change processing, and a necessary magnification change processing are simultaneously performed. Specifically, a magnification change processing unit 104 performs the magnification change processing on the image data 103a to match the resolution of the output unit, thereby obtaining data 104a.

Thereafter, an edge emphasis processing unit 105 performs an edge emphasis processing to optimize the reproducibility of a character or image line width, and the sharpness of an image end portion. Image data 105a is obtained in this manner.

Subsequently, if the user presets an original enlargement/reduction processing in the magnification instruction unit 110, the image data 105 is subjected to an enlargement/reduction processing by the enlargement/reduction processing unit 106 in accordance with a magnification 110a. Image data 106a is obtained in this manner.

A luminance/density conversion unit 107 for converting luminance data to density data is constituted of an LUT as a conversion table. Standard luminance/density conversion is close to the removing of Log from luminance value. The conversion table is constituted of ROM or RAM. Additionally, either the inputted image data 106a or outputted density data 107a is data of eight bits.

The output density correction unit 108 for correcting the density data 107a converted by the luminance/density conversion unit 107 is constituted of a plurality of output density correction tables such as LUT and a calculation circuit. Moreover, the output density correction table is constituted of ROM or RAM. In the example, a plurality of LUT's are prepared and stored in a memory.

Figure 2:
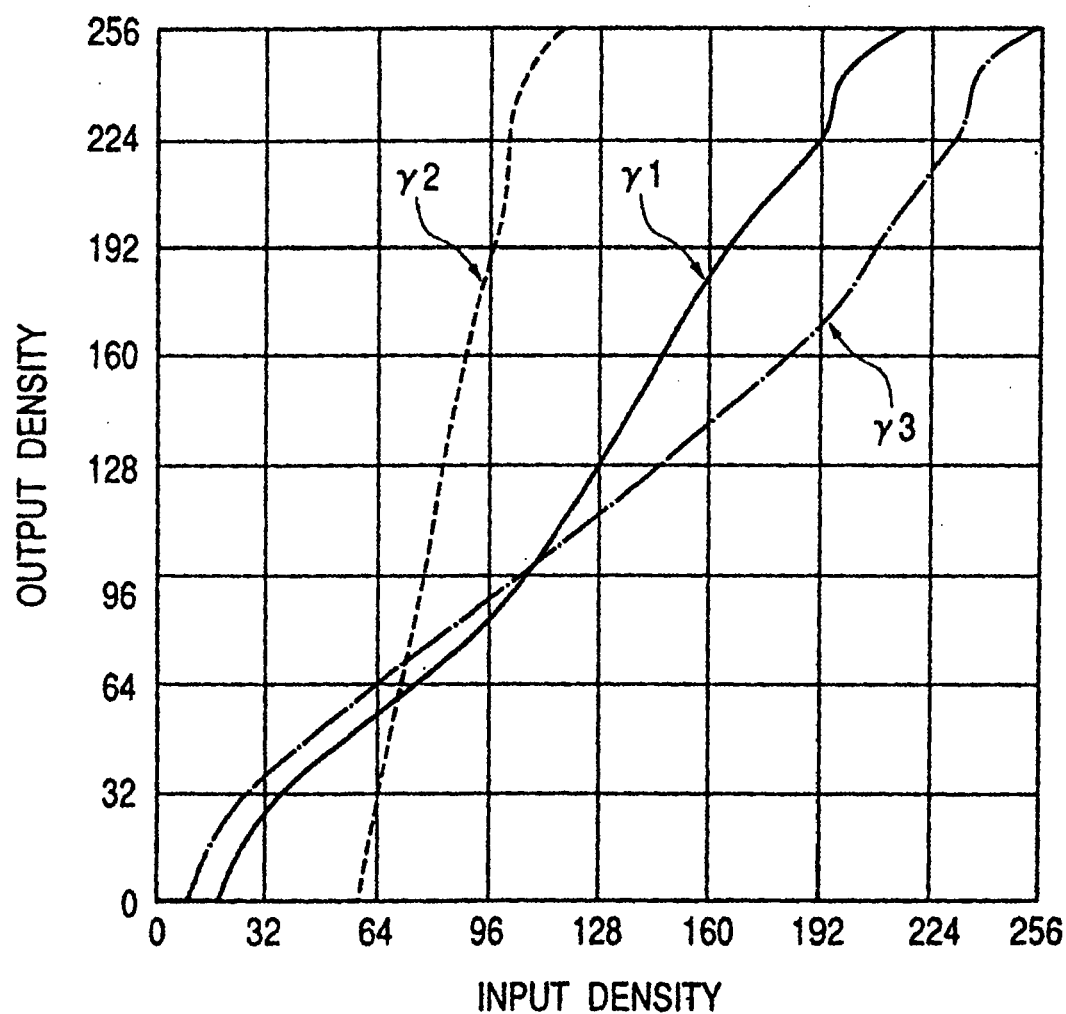
FIG. 2 is a characteristic diagram showing the values of an output density correction table.

FIG. 2 represents a graph of characteristic LUT's stored in the output density correction unit 108, and the tables are designated as γ1, γ2, γ3 to facilitate the description. Character γ1 denotes a standard output density correction table, γ2 denotes a table in which a high density section is emphasized so that the section is reproduced as close to black as possible, and γ3 denotes a table reverse to γ2, which is set to enhance the reproducibility of intermediate density.

Here, when the user does not set the enlargement/reduction processing of the original, or when the enlargement/reduction setting is in the range of 51% to 199%, γ1 is selected as LUT, and the image density is converted. Subsequently, when the enlargement processing of 200% or more is selected, the density is converted by γ2. When the reduction processing of 50% or less is selected, density is converted by γ3. Thereafter, density data 107a is outputted. Specifically, the output density correction unit 108 selects the table in accordance with the magnification data 110a from the magnification instruction unit 110.

Figure 3A:
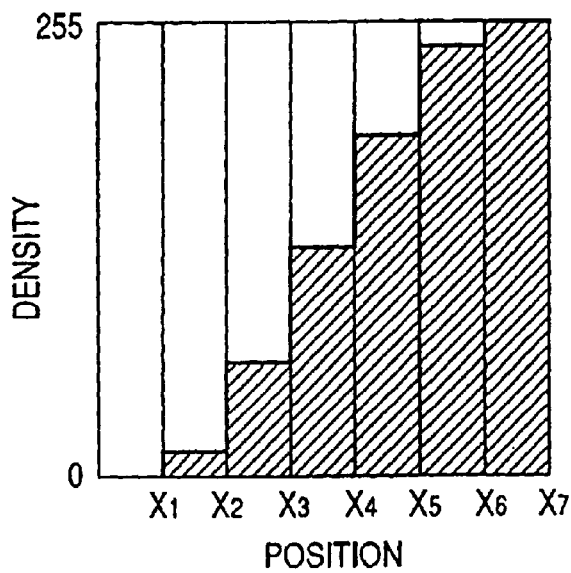
FIGS. 3A, 3B and 3C are explanatory views showing the density gradation of an image edge portion during enlargement/reduction in a primary manner.
Figure 3C:
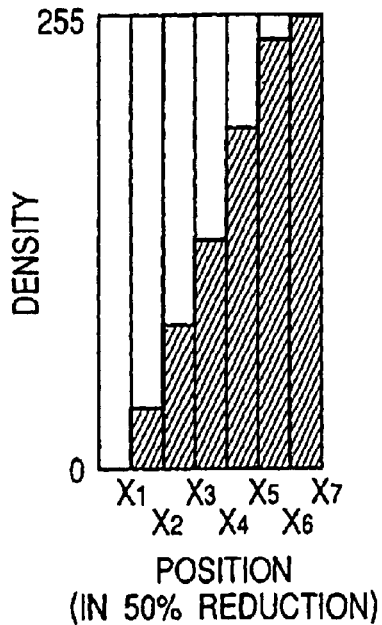
Figure 3B:
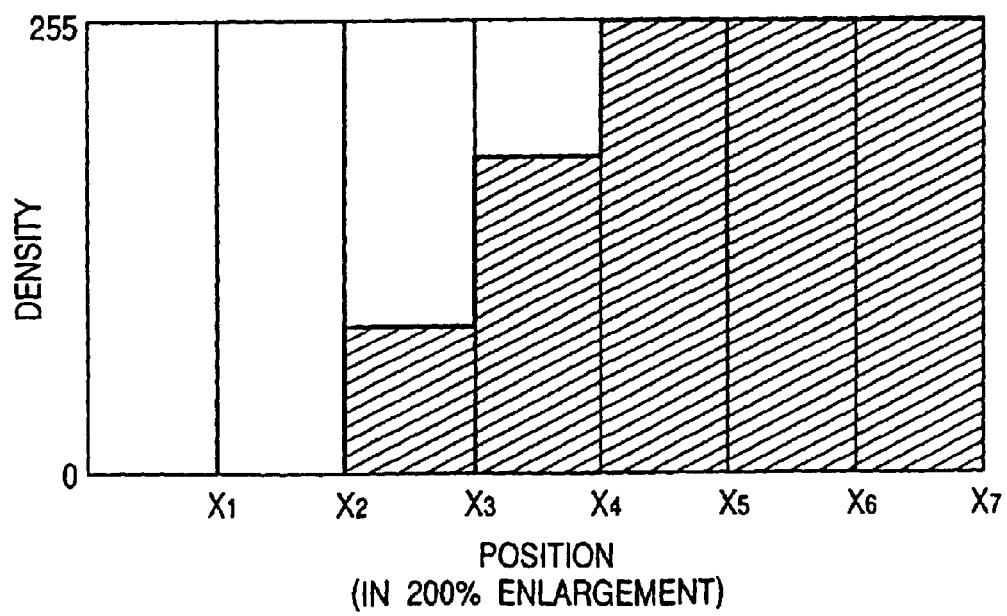

In this case, the positional relation between the outputted density data and the edge portion results in FIGS. 3A to 3C. Additionally, FIGS. 3A to 3C will be described in comparison with FIGS. 14A to 14C of the above-described conventional art.

Figure 14A:
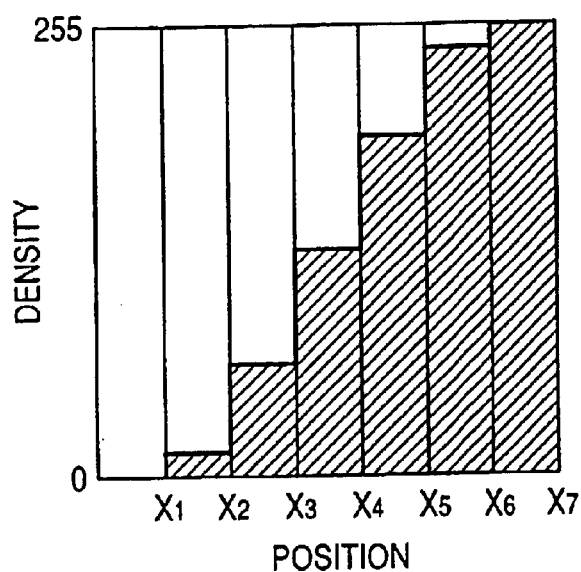
FIGS. 14A, 14B and 14C are explanatory views showing the density gradation of the image edge portion during enlargement/reduction in a conventional example.
Figure 14C:
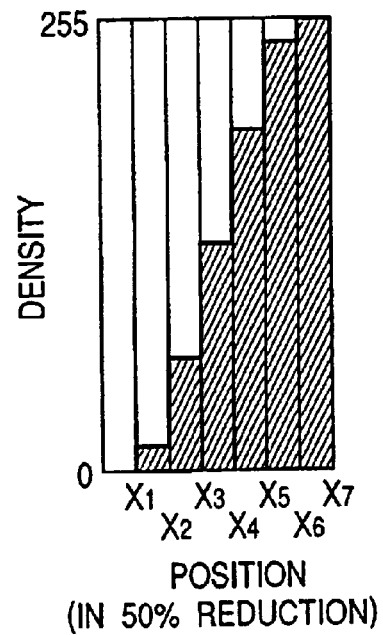
Figure 14B:
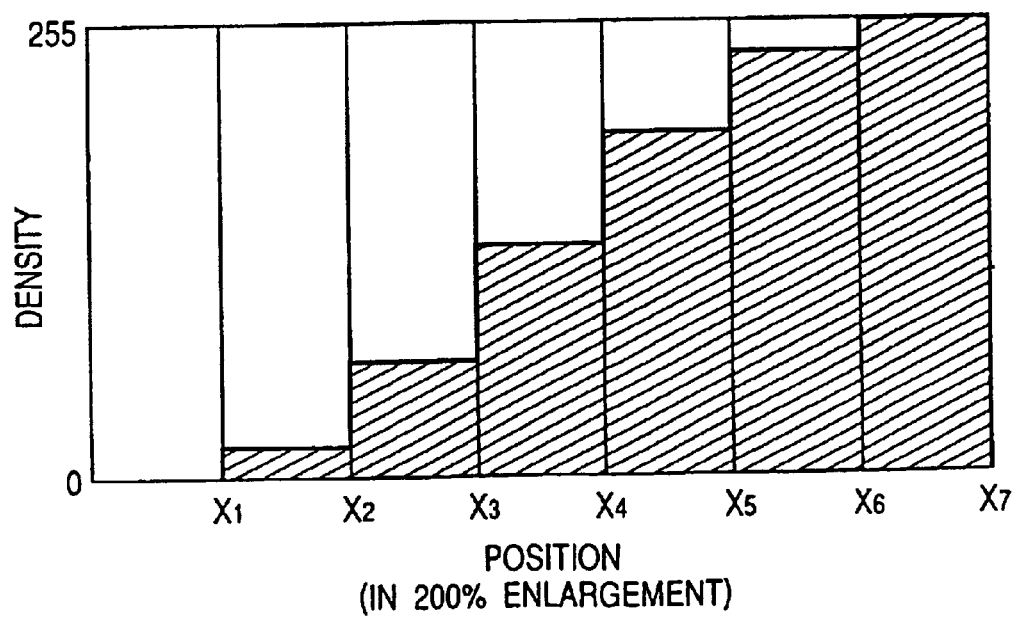

In the conventional example, as shown in FIGS. 14A to 14C, in the 200% enlargement, when the intermediate gradation is enlarged as it is, the intermediate gradation is obtained over a wide area (area of position X1 or more), and the image edge portion is dimmed. Conversely, in the 50% reduction, since the image edge portion has a steep density change, the reproduction of the intermediate gradation becomes poor.

On the other hand, in the example, as shown in FIGS. 3A to 3C, in the 200% enlargement, since the input/output density is converted by the values γ2 of LUT which make steep the conversion, the image fuzz can be alleviated by narrowing the intermediate gradation area (area of position X2 or more). Moreover, in the 50% reduction, since the input/output density is converted by the values γ3 of LUT which moderate the intermediate gradation, the quality of the intermediate gradation is kept.

Additionally, the above-described image processing device can be applied, for example, to a digital copying machine as the image forming device. In this case, the output density is corrected, and additionally the conversion to a laser drive signal is performed in the output density correction unit 108. The conversion of the drive signal is considered in the output density correction table. Subsequently, image density data 108a is sent to an output unit 109.

The printer for recording the image on paper or the like can be used as the output unit 109, which can be constituted of a laser beam printer in this case.

When the output unit 109 is constituted by a heat transfer system, an ink jet system, and the like, the conversion to the drive signals is performed in the output density correction unit 108.

Moreover, when the device is applied to facsimile, during the conversion in the output density correction unit 108, the image density data 108a is converted to an output density signal suitable for an image resolution, further converted to binary data, and subjected to a predetermined compression processing. Subsequently, the data is transmitted to a reception device via a communication channel or the like. Then, the facsimile (output unit 109) on the reception side outputs an image.

Furthermore, based on the mode set by the user, a luminance/output density conversion table for the mode at that time is first calculated from a luminance/density conversion table and an output density correction table to prepare LUT. The LUT is used to perform output or transmission in some cases.

Additionally, one conversion unit may be formed by combining the luminance/density conversion unit 107 and the output density correction unit 108, and the unit may have a conversion table which is formed by combining the luminance/density conversion table and the output density correction table.

Moreover, in the example, the output density correction table is properly used in three cases: in the reduction of 50% or less, in the reduction/same size/enlargement of 51% to 199%, and in the enlargement of 200% or more. The invention is not limited to this example, and the table may properly be used for more cases.

As described above, by preparing a plurality of output density correction tables for use as the output density correcting means, and changing the output density correction table in accordance with the enlargement/reduction magnification set by the enlargement/reduction magnification setting means, when the image is enlarged/outputted, the edge portion of the output image can be prevented from being blurred by the enlargement processing. Moreover, in the reduction/output of the image, even when the reduction processing is performed, the reproducibility of the intermediate gradation density fine lines, and the like in the input image can be enhanced.

Moreover, by preparing a plurality of output density correction tables as the output density correcting means, and changing the output density correction table in accordance with the enlargement/reduction magnification set by the enlargement/reduction magnification setting means only during the enlargement, when the image is enlarged/outputted, the edge portion of the output image can be prevented from being blurred by the enlargement processing. The image can be enlarged without largely deteriorating the image quality. The table $\gamma 2$ of FIG. 2 is used during the enlargement of 200% or more, and the table $\gamma 1$ is used in the other cases.

[Second Embodiment]

The second embodiment of the present invention will be described. Additionally, the same portion as that of the first embodiment is denoted by the same reference numeral, and the description thereof is omitted.

(Outline)

The outline of the second embodiment will first be described.

The second embodiment of the present invention comprises the scanner 101 for inputting the image density signal, an intermediate density judgment circuit 130 for detecting the area or ratio of an intermediate density portion occupying the image, the image enlargement/reduction processing unit 106 for enlarging or reducing the image signal, the enlargement/reduction magnification instruction unit 110 for setting the enlargement/reduction magnification of the image enlargement/reduction processing unit 106, and the output density correction unit 108 for correcting the image density signal to provide the density signal appropriate for the image forming device and the output resolution. The device is provided with a plurality of output density correction tables for use as the output density correction unit 108, and the output density correction table is changed in accordance with the enlargement/reduction magnification set by the enlargement/reduction magnification instruction unit 110, and the area or ratio of the intermediate density portion occupying the image.

A concrete example will be described hereinafter.

The second embodiment is different from the first embodiment in that it is provided with the means for detecting the area or ratio of the intermediate density portion occupying the image outputted by the image processing device, and is the same as the first embodiment in the other constitutions.

FIG. 4 is a block diagram showing the constitution of the second embodiment. The same constituting elements as those of FIG. 1 are denoted by the same reference numerals.

In FIG. 4, a memory 120 stores data for one screen. The intermediate density judgment circuit 130 judges based on data 120a from the memory whether the ratio of the intermediate density portion is high or less.

In a judgment method, the number of pixels as luminance signal values corresponding to a predetermined density area (e.g., 0.3 to 1.0 in terms of logarithm reflection density) in a multivalued image signal. Specifically, if the image luminance signal multivalued in the range of 0 to 255 indicates the luminance signal values of the density portion of 1.50 to 0.07, the number of pixels having the luminance signal values in the range of 20 to 138 may be counted.

Additionally, when the counted number of pixels of the intermediate density portion does not exceed 30% of 1.5 million pixels in one screen, it is judged that the ratio of the intermediate density portion is small.

The output density correction unit 108 selects the output density correction table in accordance with data 130a indicating the magnitude of the ratio of the intermediate density portion detected in this manner, and further the data 110a indicating the set enlargement/reduction ratio.

In the output density correction unit 108, when the enlargement processing of 200% or more is selected, and additionally the ratio of the intermediate density portion is low, $\gamma 2$ is selected as LUT. Moreover, when the reduction processing of 50% or less is selected, and the ratio of the intermediate density portion is high, $\gamma 3$ is selected as LUT, the image is thus processed, and the density data 108a is outputted.

In the other settings, $\gamma 1$ is selected, and the image density is converted.

As described above, even when the enlargement ratio is high, $\gamma 2$ is selected particularly for the original in which the ratio of the intermediate density portion is low (the ratio of characters is high), so that intermediate gradation reproducibility can be prevented from being deteriorated with respect to the original having many intermediate gradation images, and character edges can clearly be reproduced with respect to a character original.

Furthermore, even when the reduction ratio is high, $\gamma 3$ is selected for the original in which the ratio of the intermediate density portion is high, so that the edges can be prevented from being blurred with respect to the original with many characters, and the reproducibility of the intermediate density portion can be enhanced with respect to the photograph original.

In the example, the output density correction table is properly used in three cases: in the reduction of 50% or less, in the reduction/same size/enlargement of 51% to 199%, and in the enlargement of 200% or more. The invention is not limited to this example, and the table may properly be used in more cases.

Moreover, the ratio of the intermediate gradation density portion may be divided not only at 30%, but also more finely for judgment, before changing the table.

As described above, by preparing a plurality of output density correction tables for use as the output density correcting means, and changing the output density correction table in accordance with the enlargement/reduction magnification set by the enlargement/reduction magnification setting means, and the area or ration of the intermediate density portion occupying the image, when the image is enlarged/outputted, the reproducibility is prevented from being degraded with respect to the original with many intermediate gradation images, and the edge portion of the output image can be prevented from being blurred by the enlargement processing. Moreover, in the reduction/output of the image, edge blur is prevented with respect to the original with many characters. Even when the reduction processing is performed, the reproducibility of the intermediate gradation density fine lines, and the like in the input image can be enhanced.

[Third Embodiment]

Figure 5:
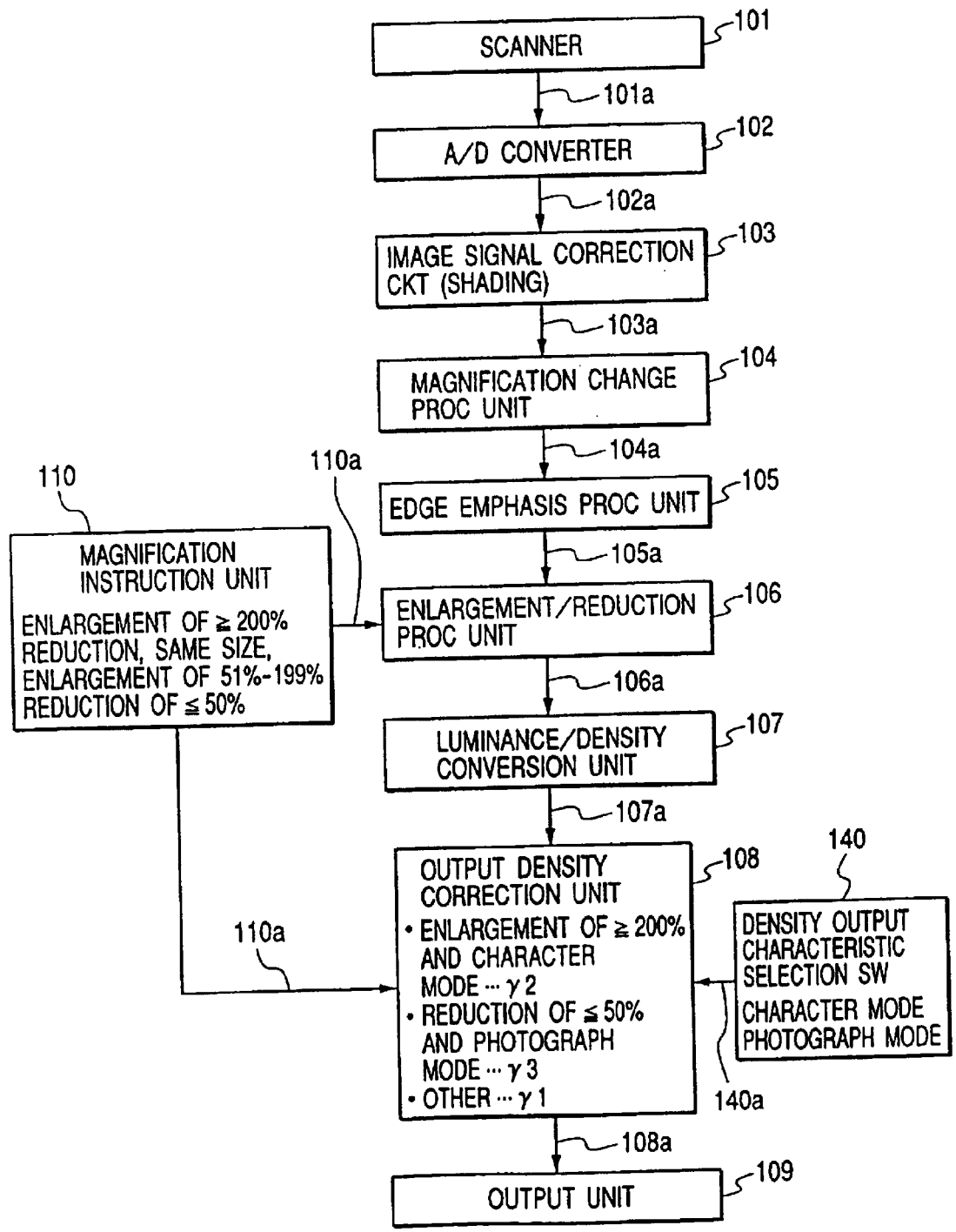
FIG. 5 is a block diagram showing the constitution of the image processing device according to a third embodiment.

The third embodiment of the present invention will be described with reference to FIG. 5. Additionally, in FIG. 5, the same portion as that of each above-described embodiment is denoted by the same reference numeral, and the description thereof is omitted.

According to the third embodiment, there is provided a density output characteristic selection switch 140 as selecting means which can select the relation of the density of the original image and the density of the image outputted by the image processing device (hereinafter referred to as the density output characteristic). The density output characteristic by the density output characteristic selection switch 140 is selected from two types of modes, a character mode and a photograph mode.

In the output density correction unit 108, the output density correction table is selected in accordance with mode data 140a from the density output characteristic selection switch 140, and further the data 110 indicating the set enlargement/reduction ratio.

In the output density correction unit 108, only when the enlargement processing of 200% or more is selected, and the character mode is selected, γ2 is selected as LUT. Only when the reduction processing of 50% or less is selected, and the photograph mode is selected, γ3 is selected as LUT, the image is thus processed, and the density data 107a is outputted.

In the other settings, γ1 is selected, and the image is processed.

In the third embodiment, the output density correction table is properly used in three cases: in the reduction of 50% or less, in the reduction/same size/enlargement of 51% to 199%, and in the enlargement of 200% or more. The invention is not limited to this embodiment, and the table may properly be used for more cases.

As described above, according to the third embodiment, since even at a high magnification ratio, γ2 is selected with respect to the original in which the character mode is selected, the intermediate gradation reproducibility can be prevented from being degraded with respect to the original of the intermediate gradation image, and the character edges can clearly be reproduced.

Furthermore, since even at a high reduction ratio, γ3 is selected with respect to the original in which the photograph mode is selected, the edge can be prevented from being blurred with respect to the original having many characters, and the reproducibility of the intermediate density portion can be enhanced with respect to the photograph original.

[Fourth Embodiment]

The fourth embodiment of the present invention will be described with reference to FIGS. 6 and 7.

(Outline)

The outline of the fourth embodiment will first be described.

The device of the fourth embodiment comprises the scanner 101 for inputting the image density signal, the image enlargement/reduction processing unit 106 for enlarging or reducing the image signal, the enlargement/reduction magnification instruction unit 110 for setting the enlargement/reduction magnification of the image enlargement/reduction processing unit 106, and the output density correction unit 108 for correcting the image density signal to provide the density signal appropriate for the image forming device and the output resolution. In the device, data calculation unit 150 has an output density correction table, subjects the values of the output density correction table to a primary conversion in accordance with the enlargement/reduction magnification set by the enlargement/reduction magnification instruction unit 110 to change the values of the output density correction table, and writes the changed data into the LUT of the output density correction unit 108.

Moreover, in accordance with the enlargement/reduction magnification set by the enlargement/reduction magnification instruction unit 110, the data calculation unit 150 applies the primary conversion to the table values so that the change amount of the output density is enlarged with respect to the change amount of the input density of the output density correction table during enlargement, or applies the primary conversion to the table values so that the change amount of the output density is reduced with respect to the change amount of the input density of the output density correction table during reduction.

A concrete example will be described hereinafter with reference to FIG. 7. In FIG. 7 the same constituting elements as those of FIG. 1 are denoted by the same reference numerals, and the description thereof is omitted.

In the example, in the output density correction unit 108 for converting the inputted image density data to the output density data, the conversion table of LUT from the data calculation unit 150 is stored in a memory.

Figure 6:
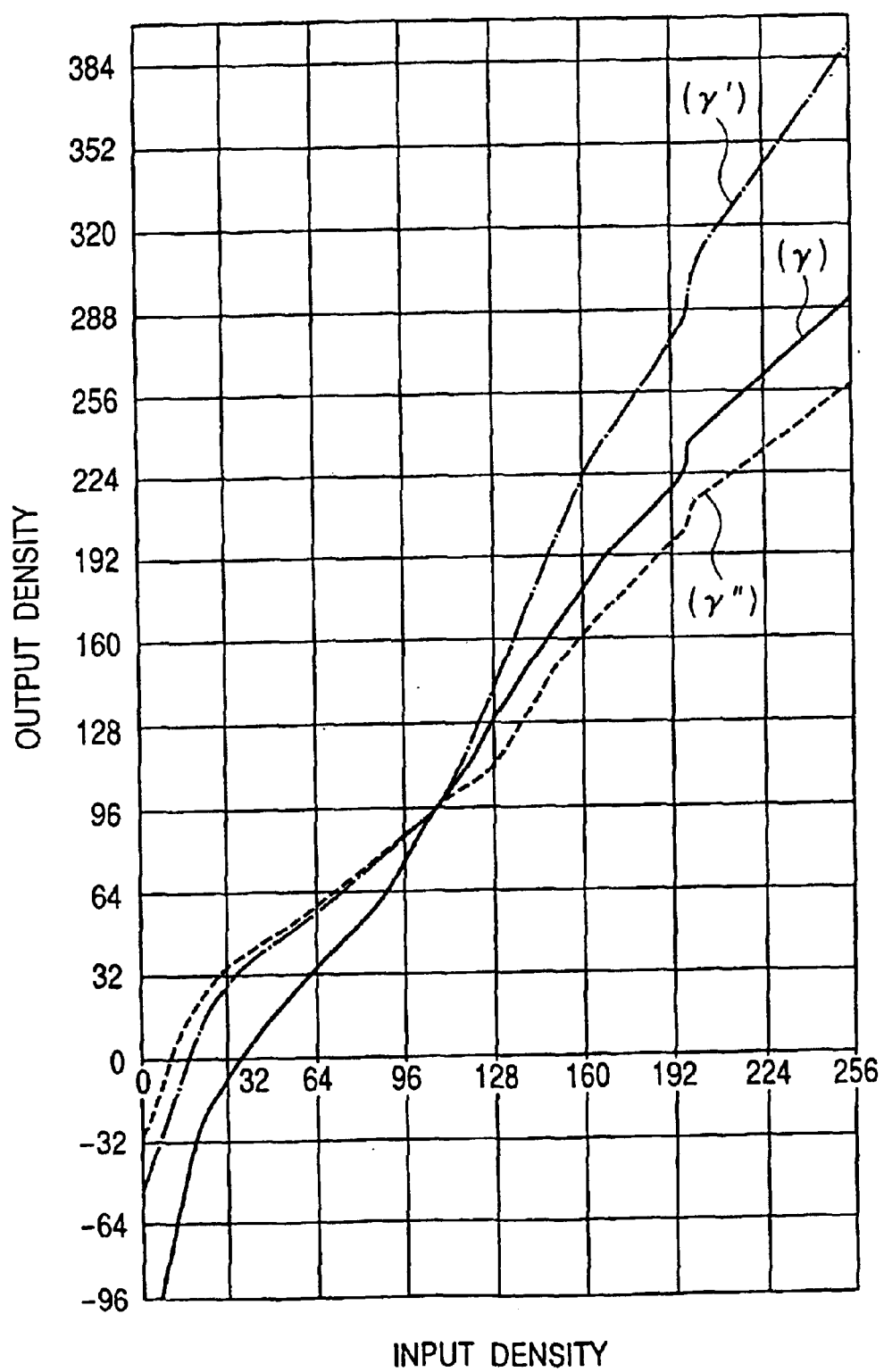
FIG. 6 is a characteristic diagram showing the values of the output density correction table according to a fourth embodiment of the present invention, and simultaneously showing two types of tables converted in the primary manner.
Figure 7:
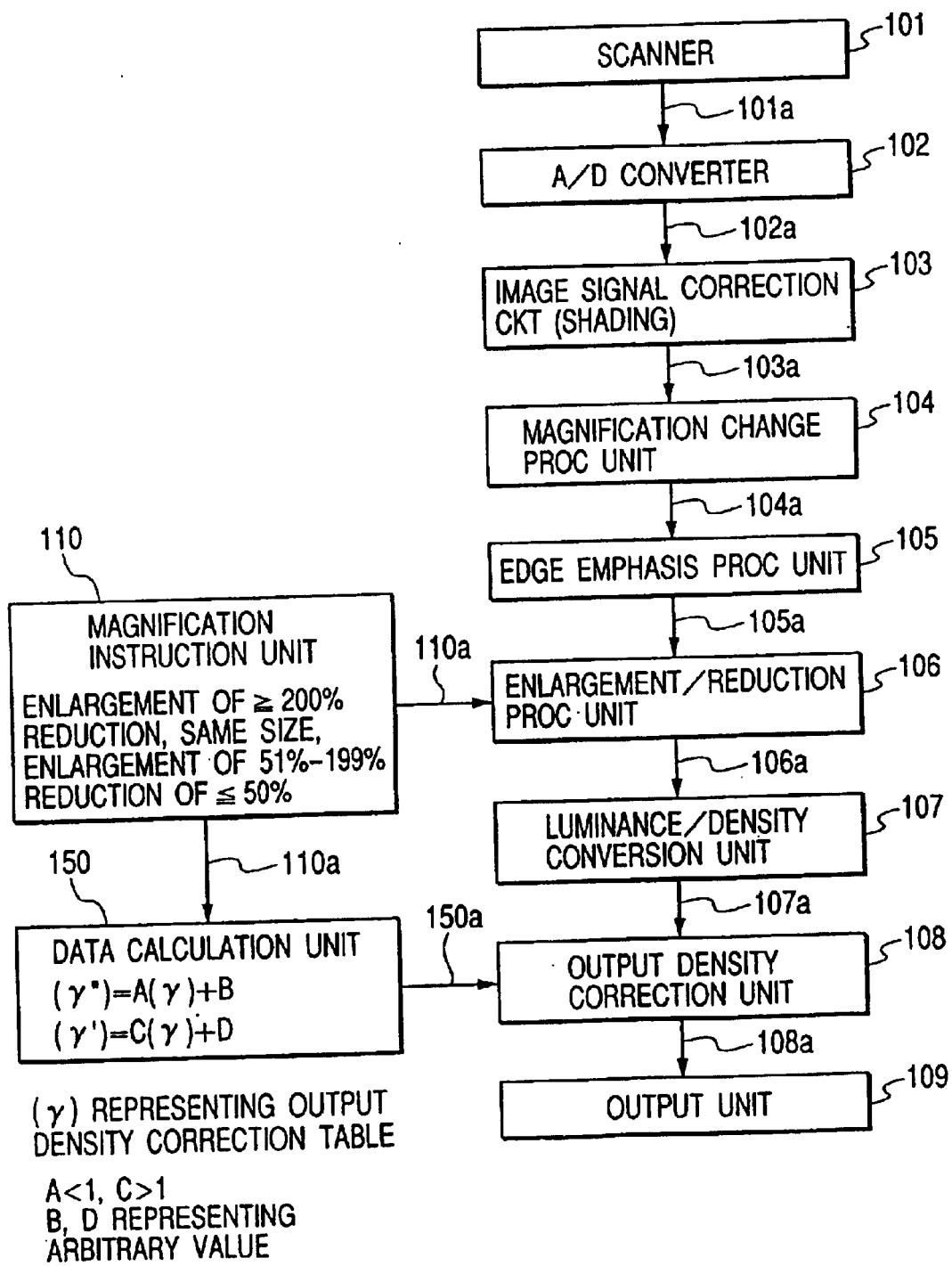
FIG. 7 is a block diagram showing the constitution of the image processing device according to the fourth embodiment.

In FIG. 6, solid-line data represents LUT of output density correction in a graph. Solid-line (γ) data is stored in the data calculation unit 150.

When the user does not set the enlargement/reduction processing of the original in the magnification instruction unit 110, or when the enlargement/reduction setting is in the range of 51% to 199%, the data calculation unit 150 writes the solid-line γ data of FIG. 6 into LUT of the output density correction unit 108 as it is, and the output density correction unit 108 performs density conversion based on the data.

When the user selects the enlargement processing of 200% or more in the magnification instruction unit 110, the data calculation unit 150 calculates (γ') data from the stored (γ) data by primary conversion by the following equation:

$(γ')=C(γ)+D$, in which $C>1$, and $D$ is an arbitrary constant.

The (γ') data obtained by the calculation is data to make steep the conversion of input/output density as shown by a dashed line of FIG. 6.

The data is written into the LUT of the output density correction unit 108, and the output density correction unit 108 converts the density based on the written data.

When the user selects the reduction processing of 50% or less in the magnification instruction unit 110, the data calculation unit 150 calculates (γ") data from the stored (γ) data by the primary conversion by the following equation:

$(γ")=A(γ)+B$, in which $A<1$, and $B$ is an arbitrary constant.

The (γ") data obtained by the calculation is data to make moderate the conversion of input/output density in the intermediate density portion as shown by a broken line of FIG. 6.

The data is written into the LUT of the output density correction unit 108, and the output density correction unit 108 converts the density based on the written data.

In the fourth embodiment, density gradation comprises 256 gradations of eight bits. Therefore, when the output value is 0 or less, the gradation is set to 0. When the value is 255 or more, the gradation is set to 255.

The density data converted as described above is outputted as the density data 108a.

In this case, the positional relation of the outputted density data and the edge portion is very similar to that of the first embodiment (see FIGS. 3A to 3C).

In the fourth embodiment, the primary conversion is properly used in three cases: in the reduction of 50% or less, in the reduction/same size/enlargement of 51% to 199%, and in the enlargement of 200% or more. The invention is not limited to this embodiment, and the conversion may properly be used for more cases.

As described above, by applying the primary conversion to the values of the output density correction table in accordance with the enlargement/reduction magnification set by the enlargement/reduction magnification instruction unit 110 to change the values of the output density correction table, the storage capacity of the table can be reduced. Additionally, in the enlargement/output of the image, the edge portion of the output image can be prevented from being blurred by the enlargement processing. Moreover, in the reduction/output of the image, even when the reduction processing is performed, the reproducibility of the intermediate gradation density fine lines in the input image can be enhanced.

Moreover, in accordance with the enlargement/reduction magnification set by the enlargement/reduction magnification instruction unit 110, by applying the primary conversion to the table values so that the change amount of the output density is enlarged with respect to the change amount of the input density of the output density correction table during enlargement, or by applying the primary conversion to the table values so that the change amount of the output density is reduced with respect to the change amount of the input density of the output density correction table during reduction, the table storage capacity can be reduced. Additionally, in the enlargement/output of the image, the edge portion of the output image can be prevented from being blurred by the enlargement processing. Moreover, in the reduction/output of the image, even when the reduction processing is performed, the reproducibility of the intermediate gradation density fine lines in the input image can be enhanced.

A modification formed by combining the second and fourth embodiments will next be described.

The modification comprises the scanner 101 for inputting the image density signal, the intermediate density judgment circuit 130 for detecting the area or ratio of the intermediate density portion occupying the image, the image enlargement/reduction processing unit 106 for enlarging or reducing the image signal, the enlargement/reduction magnification instruction unit 110 for setting the enlargement/reduction magnification of the image enlargement/reduction processing unit 106, and the output density correction unit 108 for correcting the image density signal to provide the density signal appropriate for the image forming device and the output resolution. The data calculation unit 150 has an output density correction table, and subjects the values of the output density correction table to the primary conversion in accordance with the enlargement/reduction magnification set by the enlargement/reduction magnification instruction unit 110 and the area or ratio of the intermediate density portion occupying the image to change the values of the output density correction table for use in the output density correction unit 108.

The above-described image processing can realize the same effect as that of the second embodiment with a small memory storage capacity.

Specifically in the modification, in accordance with the enlargement/reduction magnification set by the enlargement/reduction magnification instruction unit 110, when during the enlargement the area or ratio of the intermediate density portion is small, the primary conversion is applied to the table values so that the change amount of the output density is enlarged with respect to the change amount of the input density of the output density correction table. Moreover, when during reduction the area or ratio of the intermediate density portion is large, the primary conversion is applied to the table values so that the change amount of the output density is reduced with respect to the change amount of the input density of the output density correction table. Thereby, in the case of the enlargement/output of the image, the edge portion of the output print image can be prevented from being blurred by the enlargement processing.

[Fifth Embodiment]

Figure 8:
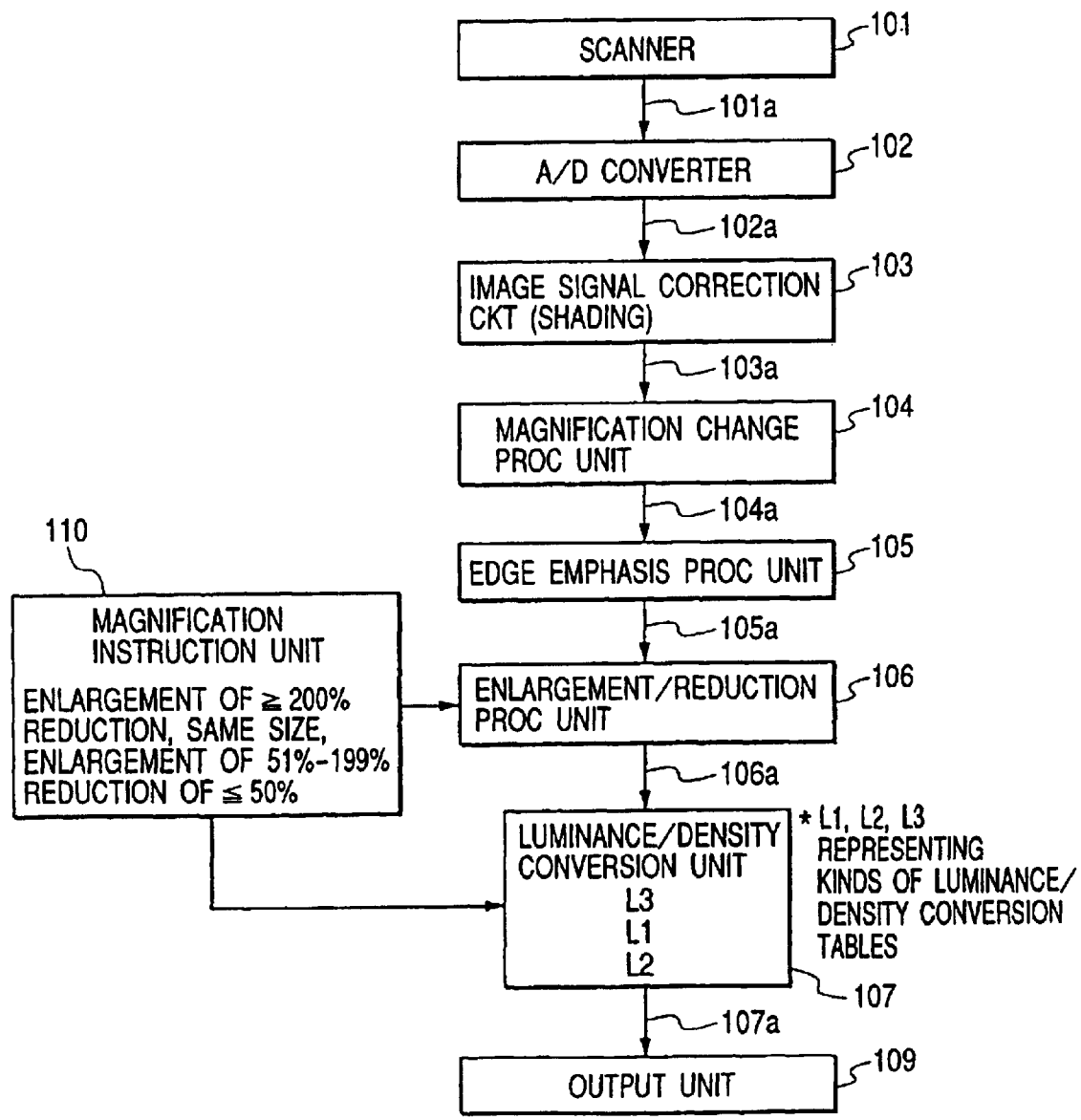
FIG. 8 is a block diagram showing the constitution of the image processing device according to a fifth embodiment of the present invention.

The fifth embodiment of the present invention will be described with reference to FIGS. 8 and 9. Additionally, the description of the same portion as the above-described portion of FIG. 1 is omitted, and the portion is denoted by the same reference numeral.

(Outline)

The outline of the fifth embodiment will first be described.

The fifth embodiment comprises the scanner 101 for inputting the luminance signal of the original image, the luminance/density conversion unit 107 for converting the luminance signal to the density signal based on luminance/density conversion information, the image enlargement/reduction processing unit 106 for enlarging or reducing the image signal, and the enlargement/reduction magnification instruction unit 110 for setting the enlargement/reduction magnification of the image enlargement/reduction processing unit 106. The luminance/density conversion unit 107 is provided with a plurality of luminance/density conversion table, and can change the luminance/density conversion table in accordance with the enlargement/reduction magnification set by the enlargement/reduction magnification instruction unit 110.

Moreover, there are a plurality of luminance/density conversion tables as luminance/density conversion information, and the luminance/density conversion table is changed in accordance with the enlargement/reduction magnification set by the enlargement/reduction magnification setting means only during enlargement.

A concrete example will be described hereinafter.

Only different portions between the device of FIG. 8 and the above-described device of FIG. 1 in the first embodiment will be described.

The luminance/density conversion unit 107 for converting luminance data to density data is constituted of the conversion table of LUT. The conversion table is constituted of ROM or RAM. Additionally, each of the inputted image data 106*a* and the outputted density data 107*a* is a data of eight bits. In the example, a plurality of LUT's are prepared, and stored in the memory.

Figure 9:
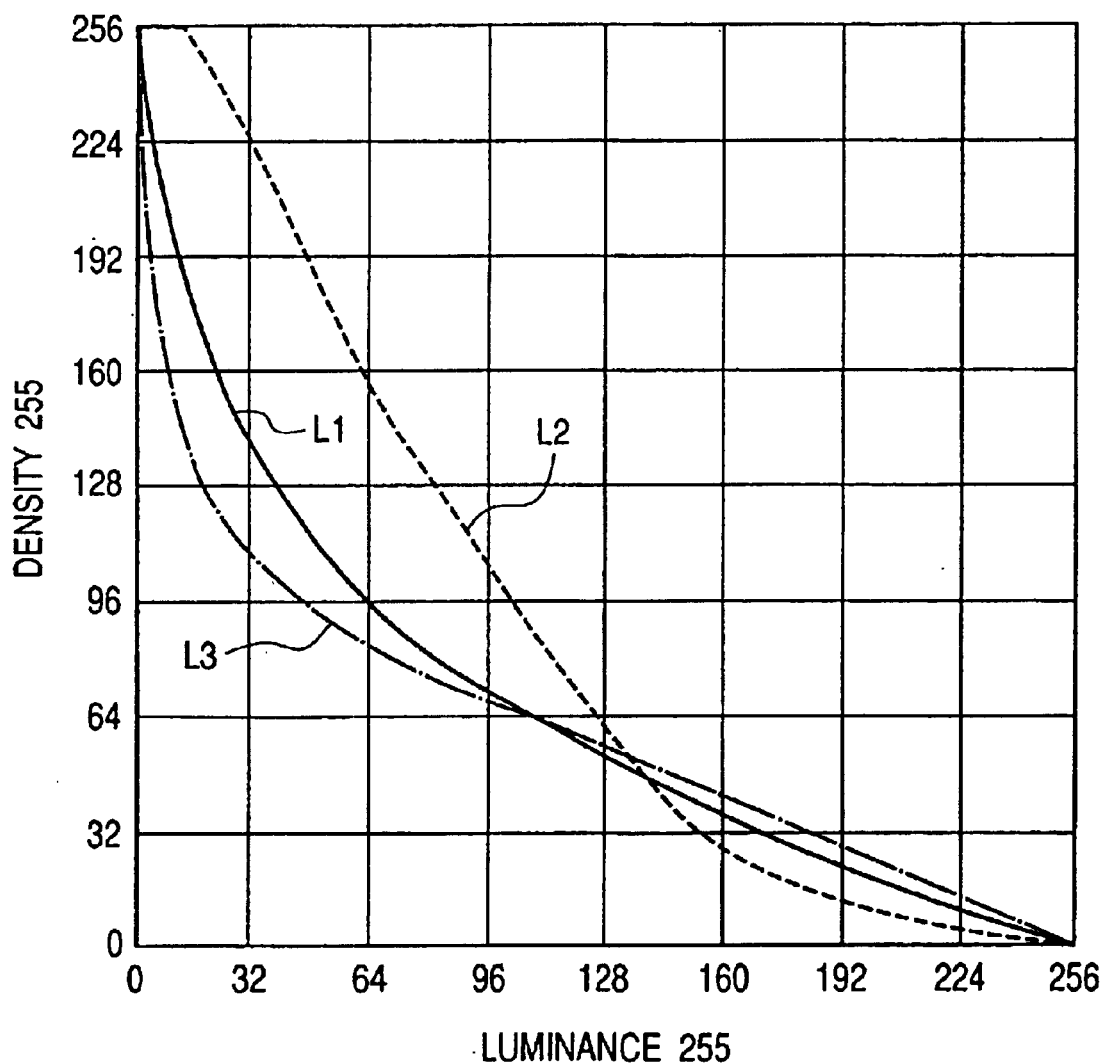
FIG. 9 is a characteristic diagram showing the values of a luminance/density correction table.
Figure 10:
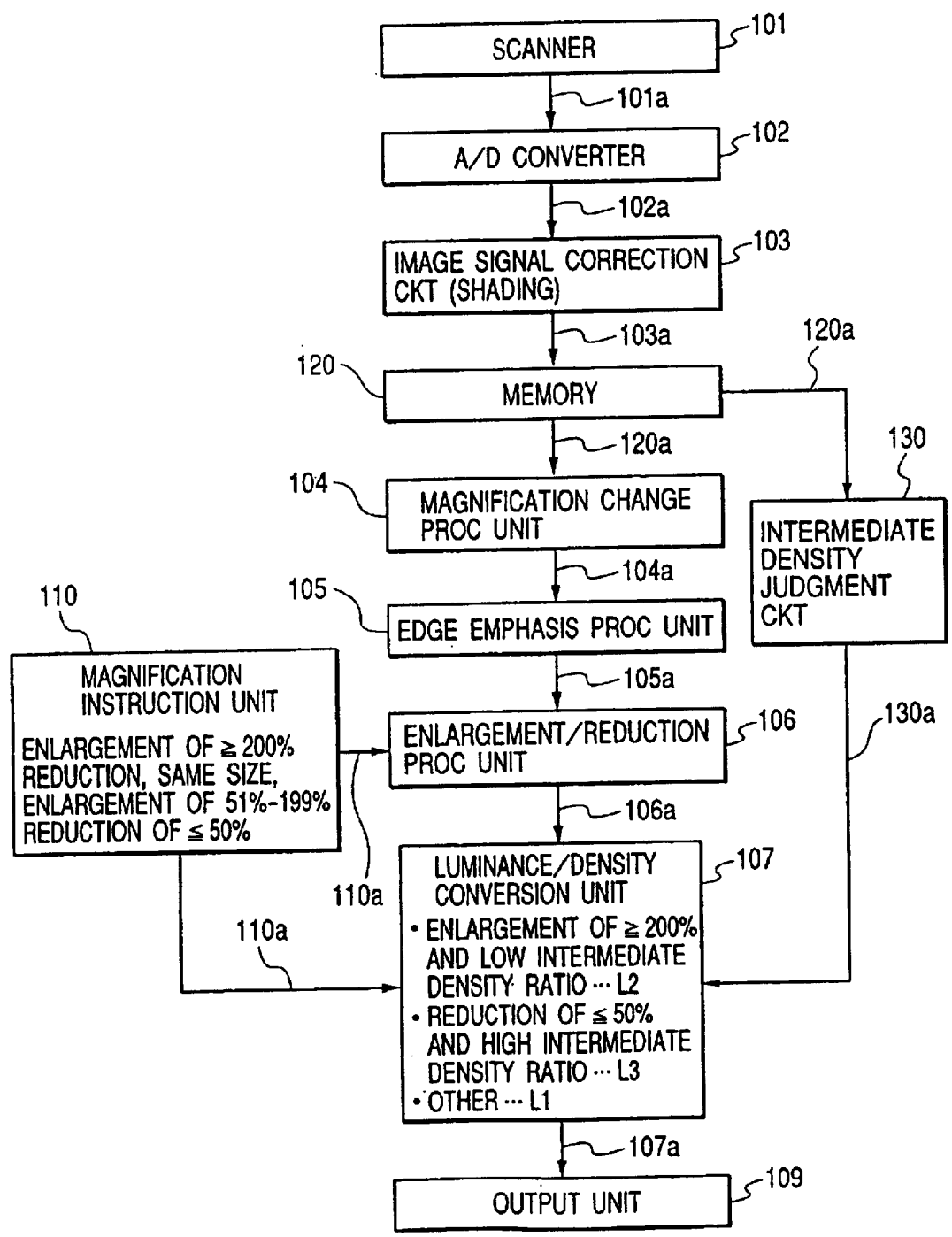
FIG. 10 is a block diagram showing the constitution of the image processing device according to a sixth embodiment.
Figure 11:
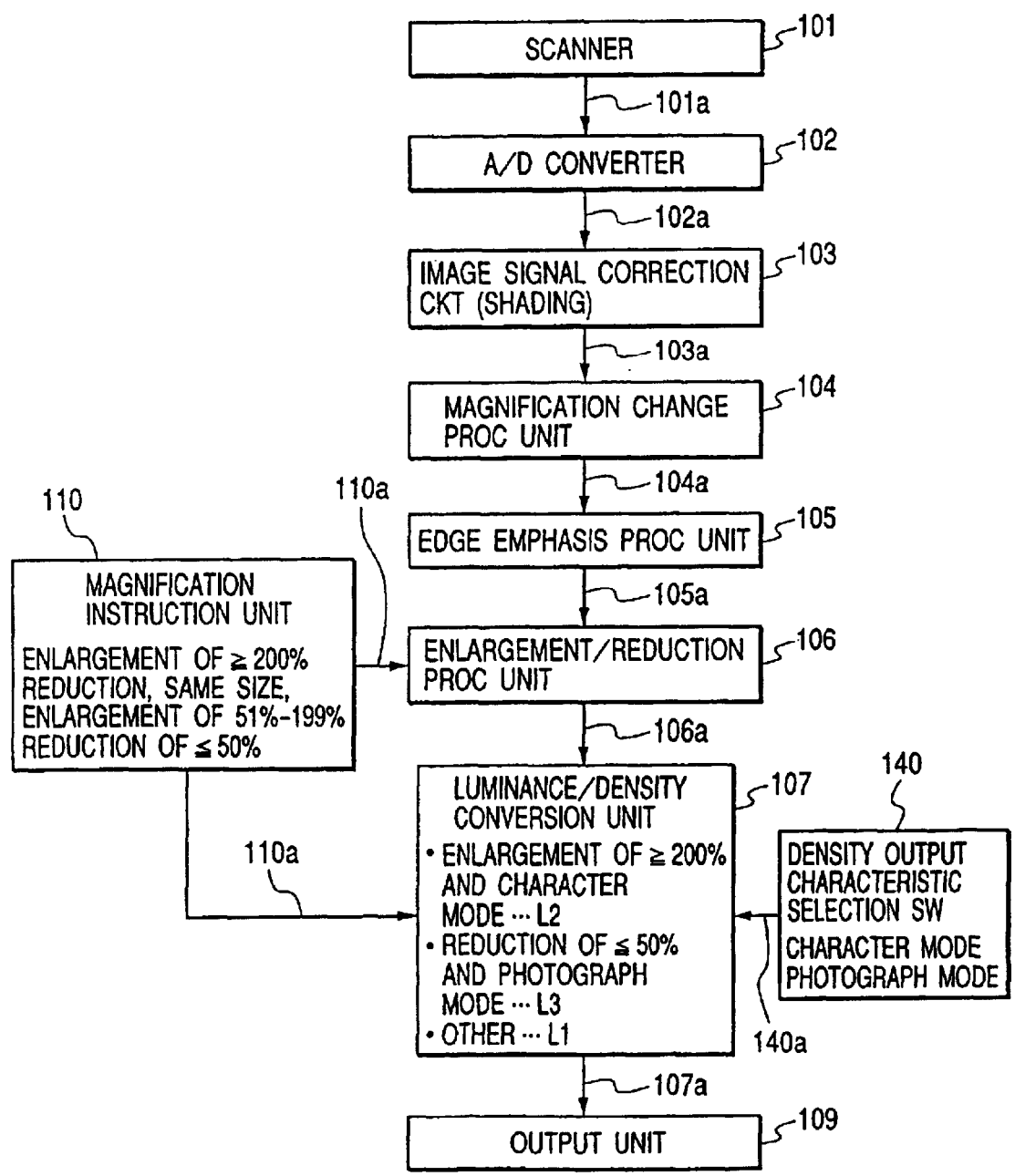
FIG. 11 is a block diagram showing the constitution of the image processing device according to a seventh embodiment.

FIG. 9 shows characteristic LUT's in a graph, and they are named as L1, L2, L3 to facilitate the description. In FIG. 9, L1 shows standard luminance/density conversion, the value is close to a luminance value with Log removed therefrom, and L2 is emphasized so that the low luminance portion is reproduced as black as possible. In reverse to L2, L3 is determined so as to enhance the reproducibility of the intermediate density.

Here, when the user does not set the enlargement/reduction processing of the original, or when the enlargement/reduction setting is in the range of 51% to 199%, L1 is selected as LUT, and the image is processed. Subsequently, when the enlargement processing of 200% or more is selected, L2 is selected. When the reduction processing of 50% or less is selected, L3 is selected, the image is thus processed, and the density data 107*a* is outputted.

In this case, the positional relation of the outputted density data and the edge portion is as shown in the above-described FIG. 3. Additionally, in the example, comparison is performed using FIGS. 14A to 14C in the same manner as in the above-described first example.

In the conventional example, as shown in FIGS. 14A to 14C, in the 200% enlargement, when the intermediate gradation is enlarged as it is, a wide area is in the intermediate gradation, and the image edge portion seems to be blurred. Moreover, in the 50% reduction, since the density of the image edge portion changes rapidly, the reproduction of the intermediate gradation becomes poor.

On the other hand, in the example, as shown in FIG. 3 described above, in the 200% enlargement, since the conversion is performed with the value L2 of LUT to make steep the luminance/density conversion, the image blur can be alleviated by narrowing the intermediate gradation area. Moreover, in the 50% reduction, since the luminance/density conversion is performed with the value L3 of LUT to make moderate in the intermediate gradation, the quality of the intermediate gradation is kept.

The image density data 107a is sent to the output unit 109. This is a printer for recording the image on paper or the like. This printer is constituted of a thermal transfer system, a laser beam system, or an ink jet system which is used in an ordinary recording device.

Moreover, when the device is applied to facsimile, the image density data 107a is subjected to a binarizing processing, then to a predetermined compression processing. Subsequently, the data is transmitted to the reception device via the communication channel or the like. Then, the image is outputted by the facsimile (output unit 109) on the reception side.

In the example, the luminance/density conversion table is properly used in three cases: in the reduction of 50% or less, in the reduction/same size/enlargement of 51% to 199%, and in the enlargement of 200% or more. The invention is not limited to this example, and the table may properly be used for more cases.

As described above, by preparing a plurality of luminance/density conversion tables as luminance/density conversion information, and changing the luminance/density conversion table in accordance with the enlargement/reduction magnification set by the enlargement/reduction magnification setting means, in the enlargement/output of the image, the edge portion of the output image can be prevented from being blurred by the enlargement processing. Moreover, in the reduction/output of the image, even when the reduction processing is performed, the reproducibility of the intermediate gradation density fine lines in the input image can be enhanced.

Moreover, by preparing a plurality of luminance/density conversion tables as the luminance/density conversion information, and changing the luminance/density conversion table in accordance with the enlargement/reduction magnification set by the enlargement/reduction magnification setting means only during the enlargement, in the enlargement/output of the image, the edge portion of the output image can be prevented from being blurred by the enlargement processing. The image can be enlarged without largely deteriorating the image quality. The table L2 of FIG. 9 is used during the enlargement of 200% or more, and the table L1 is used in the other cases.

[Sixth Embodiment]

The sixth embodiment of the present invention will be described. Additionally, the description of the same portion as the above-described portion of FIG. 4 is omitted, and the portion is denoted by the same reference numeral.

(Outline)

The outline of the sixth embodiment will first be described.

The device of the sixth embodiment comprises the scanner 101 for inputting the luminance signal of the original image, the luminance/density conversion unit 107 for converting the luminance signal to the density signal based on luminance/density conversion information, the intermediate density judgment circuit 130 for detecting the area or ratio of the intermediate density portion occupying the image, the image enlargement/reduction processing unit 106 for enlarging or reducing the image signal, and the enlargement/reduction magnification instruction unit 110 for setting the enlargement/reduction magnification of the image enlargement/reduction processing unit 106. In the device, the luminance/density conversion unit 107 is provided with a plurality of luminance/density conversion table, and can change the luminance/density conversion table in accordance with the enlargement/reduction magnification 110a set by the enlargement/reduction magnification instruction unit 110 and the data 130a indicating the area or ratio of the intermediate density portion occupying the image.

Moreover, the enlargement/reduction magnification set by the enlargement/reduction magnification instruction unit 110 indicates an enlargement magnification, and the luminance/density conversion table may be changed only when the area or ratio of the intermediate density portion is small.

A concrete example will be described hereinafter.

The sixth embodiment is different from the fifth embodiment in that it is provided with the means for detecting the area or ratio of the intermediate density portion occupying the image outputted by the image processing device, and is the same as the fifth embodiment in the other constitutions. Moreover, the memory 120 and the intermediate density judgment circuit 130 have the same constitutions as those of the second embodiment.

The intermediate density judgment circuit 130 counts the number of pixels as the luminance signal values corresponding to the predetermined density area (e.g., 0.3 to 1.0 in terms of the logarithm reflection values) in the multivalued image signal. Specifically, if the image luminance signal multivalued in the range of 0 to 255 represents the luminance signal value of the density portion of 1.50 to 0.07, the number of pixels with the luminance signal values of 20 to 138 may be counted.

Additionally, when the counted number of pixels of the intermediate density portion does not exceed 30% of 1.5 million pixels in the entire one screen, it is judged that the ratio of the intermediate density portion is small.

The luminance/density conversion unit 107 selects the luminance/density conversion table in accordance with the data 130a indicating the magnitude of the ratio of the intermediate density portion detected in this manner, and further the data 110a indicating the set enlargement/reduction ratio.

In the output density correction unit 108, when the enlargement processing of 200% or more is selected, and additionally the ratio of the intermediate density portion is low, L2 is selected as LUT. Moreover, when the reduction processing of 50% or less is selected, and the ratio of the intermediate density portion is high, L3 is selected as LUT, the image is thus processed, and the density data 107a is outputted. In the other settings, L1 is selected, and the image is processed.

In the example, the luminance/density conversion table is properly used in three cases: in the reduction of 50% or less, in the reduction/same size/enlargement of 51% to 199%, and in the enlargement of 200% or more. The invention is not limited to this example, and the table may properly be used for more cases.

Moreover, the ratio of the intermediate gradation density portion may be divided not only vertically at 30%, but also more finely for judgment, before changing the table values.

Thus, since even at a high enlargement ratio, L2 is selected with respect to the original in which the ratio of the intermediate density portion is low (the ratio of characters is high), the intermediate gradation reproducibility can be prevented from being deteriorated with respect to the original having many intermediate gradation images, and the character edges can clearly be reproduced with respect to the character original.

Furthermore, since even at a high reduction ratio, L3 is selected with respect to the original in which the ratio of the intermediate density portion is high, the edges can be prevented from being blurred with respect to the original having many characters, and the reproducibility of the intermediate density portion can be enhanced with respect to the photograph original.

Moreover, the enlargement/reduction magnification set by the enlargement/reduction magnification instruction unit 110 indicates an enlargement magnification, and the luminance/density conversion table is changed only when the area or ratio of the intermediate density portion is small. Therefore, in the enlargement/output of the image, the output image edge portion can be prevented from being blurred by the enlargement processing, and the image can be enlarged without largely deteriorating the image quality.

[Seventh Embodiment]

The seventh embodiment of the present invention will be described. Additionally, the description of the same portion as the above-described portion of each embodiment is omitted, and the portion is denoted by the same reference numeral.

In the seventh embodiment, there is provided the density output characteristic selection switch 140 as the selecting means which can select the relation of the original image density and the density of the image outputted by the image processing device (hereinafter referred to as the density output characteristic). The density output characteristic can be selected from two types of modes, character mode and photograph mode.

In the luminance/density conversion unit 107, the luminance/density conversion table is selected in accordance with the data 140a from the density output characteristic selection switch 140, and further the data 110a indicating the set enlargement/reduction ratio.

In the luminance/density conversion unit 107, only when the enlargement processing of 200% or more is selected and the character mode is selected, L2 is selected as LUT. Moreover, when the reduction processing of 50% or less is selected, and the photograph mode is selected, L3 is selected as LUT, the image is thus processed, and the density data 107a is outputted. In the other settings, L1 is selected, and the image is processed.

In the seventh embodiment, the luminance/density conversion table is properly used in three cases: in the reduction of 50% or less, in the reduction/same size/enlargement of 51% to 199%, and in the enlargement of 200% or more. The invention is not limited to this embodiment, and the table may properly be used for more cases.

As described above, according to the seventh embodiment, since even at a high enlargement ratio, L2 is selected for the original in which the character mode is selected, the intermediate gradation reproducibility can be prevented from being deteriorated with respect to the intermediate gradation image original, and the character edges can clearly be reproduced with respect to the character original.

Furthermore, since even at a high reduction ratio, L3 is selected for the original in which the photograph mode is selected, the edge can be prevented from being blurred with respect to the original with many characters, and the reproducibility of the intermediate density portion can be enhanced with respect to the photograph original.

[Eighth Embodiment]

Figure 12:
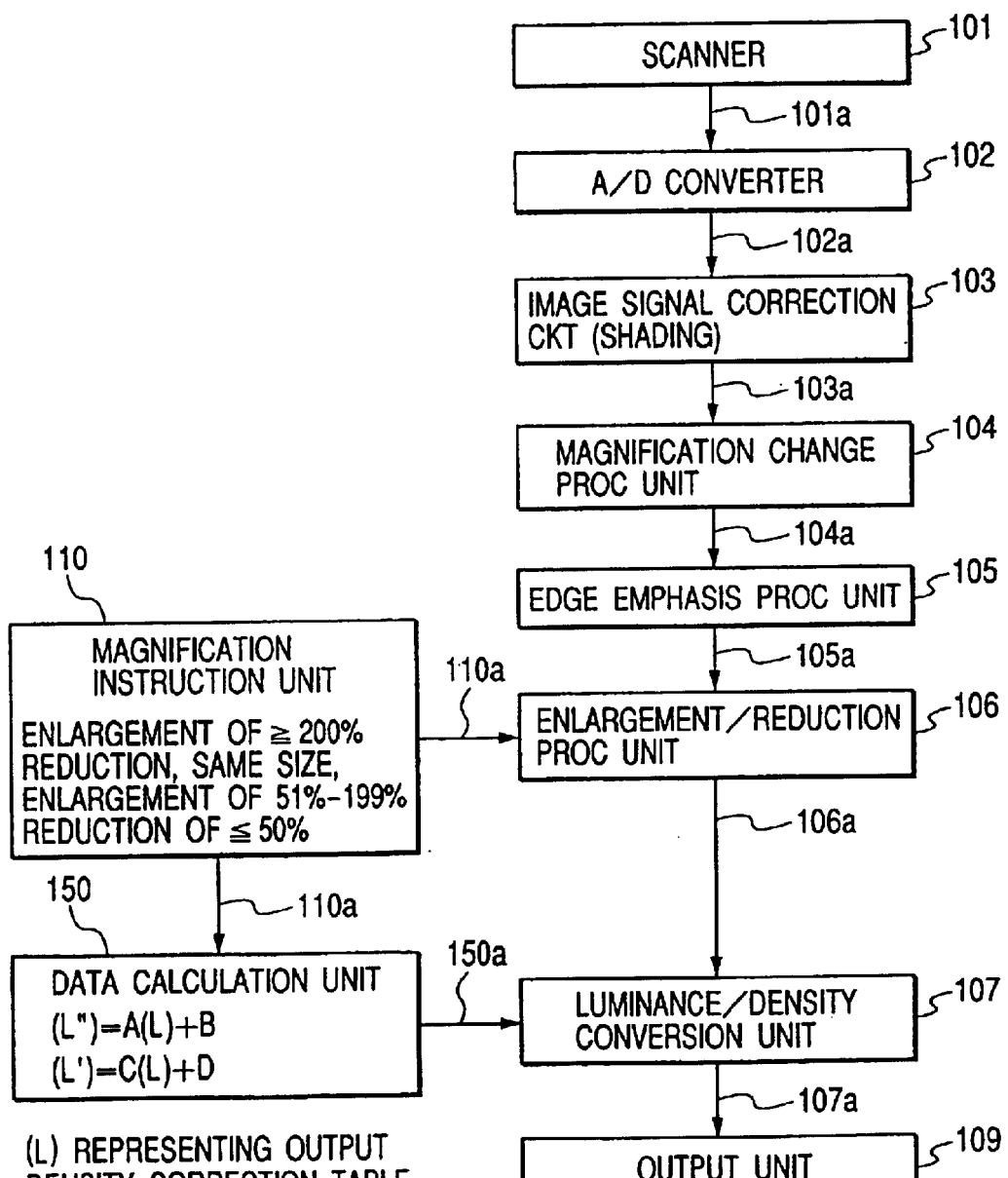
FIG. 12 is a block diagram showing the constitution of the image processing device according to an eighth embodiment.

The eighth embodiment of the present invention will be described with respect to FIGS. 12, 13. Additionally, the description of the same portion as the above-described portion of each embodiment is omitted, and the portion is denoted by the same reference numeral.

(Outline)

The outline of the eighth embodiment will first be described.

The device of the eighth embodiment comprises the scanner 101 for inputting the luminance signal of the original image, the luminance/density conversion unit 107 for converting the luminance signal to the density signal based on luminance/density conversion information, the image enlargement/reduction processing unit 106 for enlarging or reducing the image signal, and the enlargement/reduction magnification instruction unit 110 for setting the enlargement/reduction magnification of the image enlargement/reduction processing unit 106. In the device, the data calculation unit 150 has the luminance/density conversion table as the luminance/density conversion information, applies the primary conversion to the values of the luminance/density conversion table in accordance with the enlargement/reduction magnification set by the enlargement/reduction magnification instruction unit 110, changes the values of the luminance/density conversion table, and writes the calculated table into the luminance/density conversion unit 107.

Moreover, the data calculation unit 150 has the luminance/density conversion table as the luminance/density conversion information, applies, in accordance with the enlargement/reduction magnification set by the enlargement/reduction magnification setting means, the primary conversion to the table values so that the change amount of the density is enlarged with respect to the change amount of the luminance of the luminance/density conversion table during enlargement, or applies the primary conversion to the table values so that the change amount of the density is reduced with respect to the change amount of the luminance of the luminance/density conversion table during reduction.

A concrete example will be described hereinafter with reference to FIG. 12.

In the example, the conversion table of LUT from the data calculation unit is stored in the memory of the luminance/density conversion unit 107 for converting the luminance data to the density data.

Figure 13:
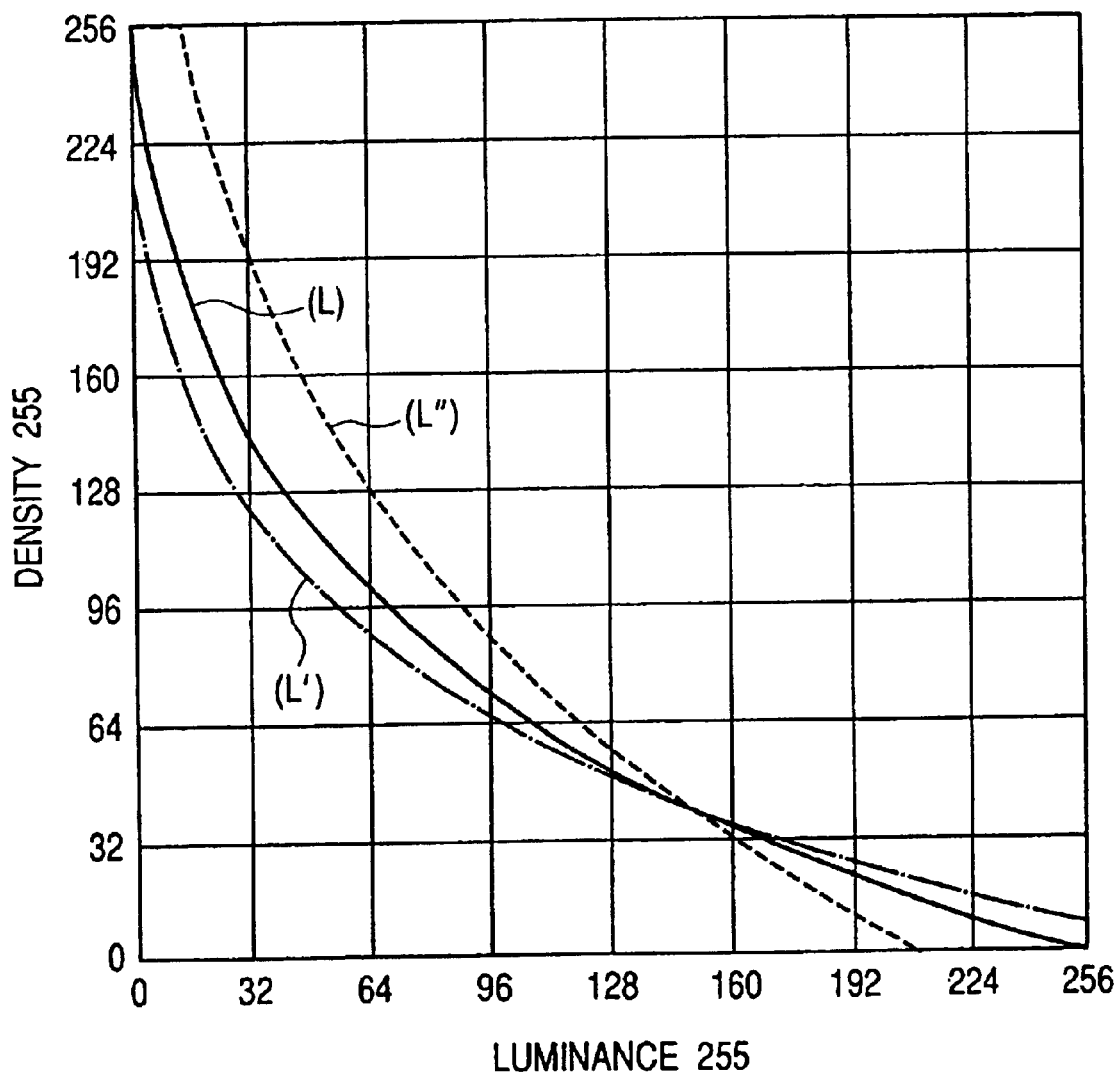
FIG. 13 is a characteristic diagram showing the values of the output density correction table according to the eighth embodiment of the present invention, and simultaneously showing two types of tables converted in the primary manner.

In FIG. 13 the LUT for the luminance/density conversion is represented by solid-line data in a graph. The solid-line (L) data is stored in the data calculation unit 150. In the same manner as the fifth embodiment, this is a standard luminance/density conversion, and the value is close to the luminance value with Log removed therefrom.

When the user does not set the enlargement/reduction processing of the original in the magnification instruction unit 110, or when the enlargement/reduction setting is in the range of 51% to 199%, the data calculation unit 150 writes the solid-line (L) data of FIG. 13 into the LUT of the luminance/density conversion unit 107 as it is, and the luminance/density conversion unit 107 performs the conversion based on the data.

When the user selects the enlargement processing of 200% or more in the magnification instruction unit 110, the data calculation unit calculates data (L') from stored data (L) by the primary conversion according to the following equation:

$$(L')=C(\gamma)+D, \text{ in which } C>1, \text{ and } D \text{ is an arbitrary constant.}$$

The data (L') obtained by the calculation is data to make steep the luminance/density conversion as shown by a dashed line of FIG. 13.

The data is written into the LUT of the luminance/density conversion unit 107, and the luminance/density conversion unit 107 performs the data conversion based on the written data.

When the user selects the reduction processing of 50% or less in the magnification instruction unit 110, the data calculation unit 150 calculates data (L") from the stored data (L) by the primary conversion according to the following equation:

$$(L")=A(L)+B, \text{ in which } A<1, \text{ and } B \text{ is an arbitrary constant.}$$

The data (L") obtained by the calculation is data to make moderate the luminance/density conversion in the intermediate density portion as shown by a broken line of FIG. 13.

The data is written into the LUT of the luminance/density conversion unit 107, and the luminance/density conversion unit 107 performs the data conversion based on the written data.

The data converted as described above is outputted as the density data 107a.

The positional relation of the outputted density data and the edge portion is very similar to that of the fifth embodiment (see FIGS. 3A to 3C).

In the eighth embodiment, the primary conversion is properly used in three cases: in the reduction of 50% or less, in the reduction/same size/enlargement of 51% to 199%, and in the enlargement of 200% or more. The invention is not limited to this embodiment, and the conversion may properly be used for more cases.

As described above, by having the luminance/density conversion table as the luminance/density conversion information, applying the primary conversion to the values of the luminance/density conversion table in accordance with the enlargement/reduction magnification set by the enlargement/reduction magnification instruction unit 110, and changing the values of the luminance/density conversion table, the table storage capacity can be reduced. Additionally, in the enlargement/output of the image, the edge portion of the output image can be prevented from being blurred by the enlargement processing. Moreover, in the reduction/output of the image, even when the reduction processing is performed, the reproducibility of the intermediate gradation density fine lines in the input image can be enhanced.

Moreover, by having the luminance/density conversion table as the luminance/density conversion information, applying, in accordance with the enlargement/reduction magnification set by the enlargement/reduction magnification instruction unit 110, the primary conversion to the table values so that the change amount of the density is enlarged with respect to the change amount of the luminance of the luminance/density conversion table during enlargement, or applying the primary conversion to the table values so that the change amount of the density is reduced with respect to the change amount of the luminance of the luminance/density conversion table during reduction, the table storage capacity can be reduced. Additionally, in the enlargement/output of the image, the output image edge portion can be prevented from being blurred by the enlargement processing. Moreover, in the reduction/output of the image, even when the reduction processing is performed, the reproducibility of the intermediate gradation density fine lines in the input image can be enhanced.

A modification formed by combining the sixth and eighth embodiments will next be described.

The device of the modification comprises the scanner 101 for inputting the luminance signal of the original image, the luminance/density conversion unit 107 for converting the luminance signal to the density signal based on the luminance/density conversion information, the intermediate density judgment circuit 130 for detecting the area or ratio of the intermediate density portion occupying the image, the image enlargement/reduction processing unit 106 for enlarging or reducing the image signal, and the enlargement/reduction magnification instruction unit 110 for setting the enlargement/reduction magnification of the image enlargement/reduction processing unit 106. The device has the luminance/density conversion table as the luminance/density conversion information, the data calculation unit applies the primary conversion to the values of the luminance/density conversion table in accordance with the enlargement/reduction magnification set by the enlargement/reduction magnification setting means and the area or ratio of the intermediate density portion occupying the image, and the values of the luminance/density conversion table are changed.

By this image processing, the table storage capacity can be reduced. In the enlargement/output of the image, the edge portion of the output print image can be prevented from being blurred by the enlargement processing. Moreover, in the reduction/output of the image, even when the reduction processing is performed, the output print reproducibility of the intermediate gradation density fine lines in the input image can be enhanced.

Specifically in the modification, in accordance with the enlargement/reduction magnification set by the enlargement/reduction magnification instruction unit 110, during the enlargement, and when the area or ratio of the intermediate density portion is small, the table values are subjected to the primary conversion so that the change amount of the density is enlarged with respect to the change amount of the luminance of the luminance/density conversion table. Moreover, during the reduction, and when the area or ratio of the intermediate density portion is large, the table values are subjected to the primary conversion so that the change amount of the density is reduced with respect to the change amount of the luminance of the luminance/density conversion table.

In the enlargement/output of the image by the image processing, the edge portion of the output print image can be prevented from being blurred by the enlargement processing.

Additionally, the present invention may be applied to a system constituted by a plurality of apparatuses (e.g., host computer, interface apparatus, reader, printer, and the like), or to a device comprising a single apparatus (e.g., copying machine, or facsimile device).

Moreover, it goes without saying that the present invention can be applied to achievement by supplying the program to the system or the device. Additionally, also when the storage medium storing the program represented by the software for achieving the present invention is supplied to the system or the device, and the computer (or CPU or MPU) of the system or the device reads and executes the program code stored in the storage medium, the effect of the present invention can be realized.

In this case, the program code itself read from the storage medium realizes the above-described embodiment functions, and the storage medium storing the program code constitutes the present invention.

The storage media for supplying the program code, such as, a floppy disk, a hard disk, an optical disk, an optomagnetic disk, CD-ROM, CD-R, a magnetic tape, a nonvolatile memory card, and ROM (mask ROM, flash EEPROM, and the like) can be used.

Moreover, in addition to the realization of the embodiment functions by executing the program code read by the computer, needless to say, the present invention includes a case comprising performing a part or the whole of the actual processing based on the instruction of the program code by OS (operating system) or the like operating on the computer, and realizing the embodiment functions by the processing.

Furthermore, it goes without saying that the present invention includes a case comprising writing the program code read from the storage medium to the memory disposed in the function expansion board inserted to the computer or the function expansion unit connected to the computer, performing a part or the whole of the actual processing based on the instruction of the program code by CPU or the like disposed on the function expansion board or the function expansion unit, and realizing the embodiment functions by the processing.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof expect as defined in the appended claims.

What is claimed is:

1. An image processing device for performing a conversion processing of image data, comprising:
    input means for inputting image data;
    enlargement/reduction magnification setting means for setting an enlargement/reduction magnification of the image data input by said input means;
    data converting means having a plurality of image data density conversion tables and using one selected density conversion table to convert said input image data to output data; and
    table selecting means for selecting said density conversion table in accordance with the enlargement/reduction magnification set by said enlargement/reduction magnification setting means.

2. An image processing device according to claim 1, wherein said table selecting means selects the density conversion table in which a change amount of output image data is enlarged with respect to the change amount of input image data when the enlargement magnification is set to a predetermined value or more.

3. An image processing device according to claim 1, wherein said table selecting means selects the density conversion table in which a change amount of output image data is reduced with respect to the change amount of input image data when the reduction magnification is set to a predetermined value or less.

4. An image processing device according to claim 1, further comprising judging means for judging an amount or a ratio of intermediate density data of the input image data, wherein said table selecting means selects said density conversion table according to the enlargement/reduction magnification and the judged result of said judging means.

5. An image processing device according to claim 4, wherein said table selecting means selects the density conversion table in which a change amount of the output image data is large with respect to a change amount of the input image data, when it is judged by said judging means that the intermediate density data is small and the enlargement magnification equal to or higher than a predetermined value is set.

6. An image processing device according to claim 4, wherein said table selecting means selects the density conversion table in which a change amount of the output image data is small with respect to a change amount of the input image data, when it is judged by said judging means that the intermediate density data is large and the reduction magnification equal to or lower than a predetermined value is set.

7. An image processing device according to claim 1, further comprising output characteristic selecting means for selecting a density output characteristic, wherein said table selecting means selects the density conversion table according to the enlargement/reduction magnification and the density output characteristic selected by said output characteristic selecting means.

8. An image processing device according to claim 7, wherein said output characteristic selecting means can select either one of a character mode and a photograph mode both provided as output characteristics, and
    wherein said table selecting means selects the density conversion table in which a change amount of the output image data is large with respect to a change amount of the input image data, when the character mode is selected by said output characteristic selecting means and the enlargement magnification equal to or higher than a predetermined value is set.

9. An image processing device according to claim 7, wherein said output characteristic selecting means can select either one of a character mode and a photograph mode both provided as output characteristics, and
    wherein said table selecting means selects the density conversion table in which a change amount of the output image data is small with respect to a change amount of the input image data, when the photograph mode is selected by said output characteristic selecting means and the enlargement magnification equal to or lower than a predetermined value is set.

10. An image processing device for performing a conversion processing of image data, comprising:
    input means for inputting luminance data;
    enlargement/reduction magnification setting means for setting an enlargement/reduction magnification of the luminance data inputted by said input means;
    data converting means having a plurality of luminance/density conversion tables and using one selected luminance/density conversion table to convert said inputted luminance data to output density data; and
    table selecting means for selecting said luminance/density conversion table in accordance with the enlargement/ reduction magnification set by said enlargement/ reduction magnification setting means.

11. An image processing device according to claim 10, further comprising judging means for judging an amount or a ratio of intermediate density data of the input luminance data, wherein said table selecting means selects said luminance/density conversion table according to the enlargement/reduction magnification and the judged result of said judging means.

12. An image processing device according to claim 11, wherein said table selecting means selects the luminance/ density conversion table which has been set to convert a low-luminance portion into high luminance as compared with a standard luminance/density conversion table, when it is judged by said judging means that the intermediate density data is small and the enlargement magnification equal to or higher than a predetermined value is set.

13. An image processing device according to claim 11, wherein said table selecting means selects the luminance/ density conversion table which has been set to improve reproducibility of an intermediate density portion as compared with a standard luminance/density conversion table, when it is judged by said judging means that the intermediate density data is large and the reduction magnification equal to or lower than a predetermined value is set.

14. An image processing device according to claim 10, further comprising output characteristic selecting means for selecting a density output characteristic, wherein said table selecting means selects the luminance/density conversion table according to the enlargement/reduction magnification and the density output characteristic selected by said output characteristic selecting means.

15. An image processing device according to claim 14, wherein said output characteristic selecting means can select either one of a character mode and a photograph mode both provided as output characteristics, and wherein said table selecting means selects the luminance/ density conversion table which has been set to convert a low-luminance portion into high luminance as compared with a standard luminance/density conversion table, when the character mode is selected by said output characteristic selecting means and the enlargement magnification equal to or higher than a predetermined value is set.

16. An image processing device according to claim 14, wherein said output characteristic selecting means can select either one of a character mode and a photograph mode both provided as output characteristics, and said table selecting means selects the luminance/density conversion table which has been set to improve reproducibility of an intermediate density portion as compared with a standard luminance/ density conversion table, when the photograph mode is selected by said output characteristic selecting means and the reduction magnification equal to or lower than a predetermined value is set.

17. An image processing method for performing a conversion processing of image data, comprising:

an input step for inputting image data;

an enlargement/reduction magnification setting step for setting an enlargement/reduction magnification of the image data input in said input step;

a data converting step having a plurality of image data density conversion tables and using one selected density conversion table to convert said input image data to output data; and a table selecting step for selecting said density conversion table in accordance with the enlargement/reduction magnification set in said enlargement/reduction magnification setting step.

18. An image processing method according to claim 17, wherein said table selecting step selects the density conversion table in which a change amount of output image data is enlarged with respect to the change amount of input image data when the enlargement magnification is set to a predetermined value or more.

19. An image processing method according to claim 17, wherein said table selecting step selects the density conversion table in which a change amount of output image data is reduced with respect to the change amount of input image data when the reduction magnification is set to a predetermined value or less.

20. An image processing method according to claim 17, further comprising a judging step for judging an amount or a ratio of intermediate density data of the input image data, wherein said table selecting step selects said density conversion table according to the enlargement/reduction magnification and the judged result of said judging step.

21. An image processing method according to claim 20, wherein said table selecting step selects the density conversion table in which a change amount of the output image data is large with respect to a change amount of the input image data, when it is judged in said judging step that the intermediate density data is small and the enlargement magnification equal to or higher than a predetermined value is set.

22. An image processing method according to claim 20, wherein said table selecting step selects the density conversion table in which a change amount of the output image data is small with respect to a change amount of the input image data, when it is judged in said judging step that the intermediate density data is large and the reduction magnification equal to or lower than a predetermined value is set.

23. An image processing method according to claim 17, further comprising an output characteristic selecting step for selecting a density output characteristic, wherein said table selecting step selects the density conversion table according to the enlargement/reduction magnification and the density output characteristic selected in said output characteristic selecting step.

24. An image processing method according to claim 23, wherein said output characteristic selecting step can select either one of a character mode and a photograph mode both provided as output characteristics, and wherein said table selecting step selects the density conversion table in which a change amount of the output image data is large with respect to a change amount of the input image data, when the character mode is selected in said output characteristic selecting step and the enlargement magnification equal to or higher than a predetermined value is set.

25. An image processing method according to claim 23, wherein said output characteristic selecting step can select either one of a character mode and a photograph mode both provided as output characteristics, and wherein said table selecting step selects the density conversion table in which a change amount of the output image data is small with respect to a change amount of the input image data, when the photograph mode is selected in said output characteristic selecting step and the enlargement magnification equal to or lower than a predetermined value is set.

26. An image processing method for performing a conversion processing of image data, comprising:

an input step for inputting luminance data;

an enlargement/reduction magnification setting step for setting an enlargement/reduction magnification of the luminance data inputted in said input step;

a data converting step having a plurality of luminance/density conversion tables and using one selected luminance/density conversion table to convert said inputted luminance data to output density data; and a table selecting step for selecting said luminance/density conversion table in accordance with the enlargement/reduction magnification set in said enlargement/reduction magnification setting step.

27. An image processing method according to claim 26, further comprising a judging step for judging an amount or a ratio of intermediate density data of the input luminance data, wherein said table selecting step selects said luminance/density conversion table according to the enlargement/reduction magnification and the judged result of said judging step.

28. An image processing method according to claim 27, wherein said table selecting step selects the luminance/density conversion table which has been set to convert a low-luminance portion into high luminance as compared with a standard luminance/density conversion table, when it is judged in said judging step that the intermediate density data is small and the enlargement magnification equal to or higher than a predetermined value is set.

29. An image processing method according to claim 27, wherein said table selecting step selects the luminance/density conversion table which has been set to improve reproducibility of an intermediate density portion as compared with a standard luminance/density conversion table, when it is judged in said judging step that the intermediate density data is large and the reduction magnification equal to or lower than a predetermined value is set.

30. An image processing method according to claim 26, further comprising an output characteristic selecting step for selecting a density output characteristic, wherein said table selecting step selects the luminance/density conversion table according to the enlargement/reduction magnification and the density output characteristic selected in said output characteristic selecting step.

31. An image processing method according to claim 30, wherein said output characteristic selecting step can select either one of a character mode and a photograph mode both provided as output characteristics, and wherein said table selecting step selects the luminance/density conversion table which has been set to convert a low-luminance portion into high luminance as compared with a standard luminance/density conversion table, when the character mode is selected in said output characteristic selecting step and the enlargement magnification equal to or higher than a predetermined value is set.

32. An image processing method according to claim 30, wherein said output characteristic selecting step can select either one of a character mode and a photograph mode both provided as output characteristics, and said table selecting step selects the luminance/density conversion table which has been set to improve reproducibility of an intermediate density portion as compared with a standard luminance/density conversion table, when the photograph mode is selected in said output characteristic selecting step and the reduction magnification equal to or lower than a predetermined value is set.

* * * * *